(12) United States Patent
Wu

(10) Patent No.: US 10,906,549 B2
(45) Date of Patent: Feb. 2, 2021

(54) SYSTEMS AND METHODS OF AUTONOMOUSLY CONTROLLING VEHICLE LANE CHANGE MANEUVER

(71) Applicant: NIO USA, Inc., San Jose, CA (US)

(72) Inventor: Albert Wu, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 73 days.

(21) Appl. No.: 16/213,392

(22) Filed: Dec. 7, 2018

(65) Prior Publication Data
US 2020/0180633 A1    Jun. 11, 2020

(51) Int. Cl.
*B60W 30/18*    (2012.01)
*G08G 1/16*    (2006.01)
*B60W 30/16*    (2020.01)

(52) U.S. Cl.
CPC ...... *B60W 30/18163* (2013.01); *B60W 30/16* (2013.01); *G08G 1/167* (2013.01); *B60W 2720/106* (2013.01)

(58) Field of Classification Search
CPC .......... B60W 30/18163; B60W 30/16; B60W 2720/106; G08G 1/167
USPC ....................................................... 701/41
See application file for complete search history.

(56) References Cited

U.S. PATENT DOCUMENTS

2017/0242435 A1 *    8/2017 Nilsson .................. G08G 1/167

OTHER PUBLICATIONS

Feher et al., Constrained time-optimal control of double-integrator system and its application in MPC, Journal of Physics: Conference Series, 2017, 783, retrieved from http://iopscience.iop.org/article/10.1088/1742-6596/783/1/012024/pdf, 13 pages.

* cited by examiner

*Primary Examiner* — Brian P Sweeney
(74) *Attorney, Agent, or Firm* — Sheridan Ross P.C.

(57) ABSTRACT

Systems of an electrical vehicle and the operations thereof are provided. A vehicle control system of a vehicle determines a range of lane change initiation times. For a plurality of lane change initiation times in the range of lane change initiation times the vehicle control system determines a set of reachable states. The set of reachable states comprises a plurality of reachable states. For one or more reachable states of the plurality of reachable states the vehicle control system computes an ensuing trajectory. The vehicle control system compares each of the computed ensuing trajectories. Based on the comparison of the computed ensuing trajectories the vehicle control system determines an optimal lane change maneuver. The vehicle control system executes the optimal lane change maneuver by controlling the vehicle from a first lane to a second lane.

20 Claims, 15 Drawing Sheets

| Obstacle ID | Lane ID | Speed | Accel | Distance | FWD/BACK |
|---|---|---|---|---|---|
| 8001 | 00 | 1.01 | 0.0 | 10 | F |
| 8002 | 01 | 1.20 | 0.1 | 6 | F |
| 8003 | 10 | 1.10 | -0.2 | -6 | F |
| 8004 | 01 | 0.95 | 0.0 | 20 | B |

| Obstacle ID | Lane ID | Speed | Accel | Distance | FWD/BACK |
|---|---|---|---|---|---|
| 8001 | 10 | 1.01 | 0.0 | 10 | F |
| 8002 | 00 | 1.20 | 0.1 | 6 | F |
| 8004 | 00 | 0.95 | 0.0 | 20 | B |
| 8005 | 01 | 0.98 | -0.1 | -8 | F |

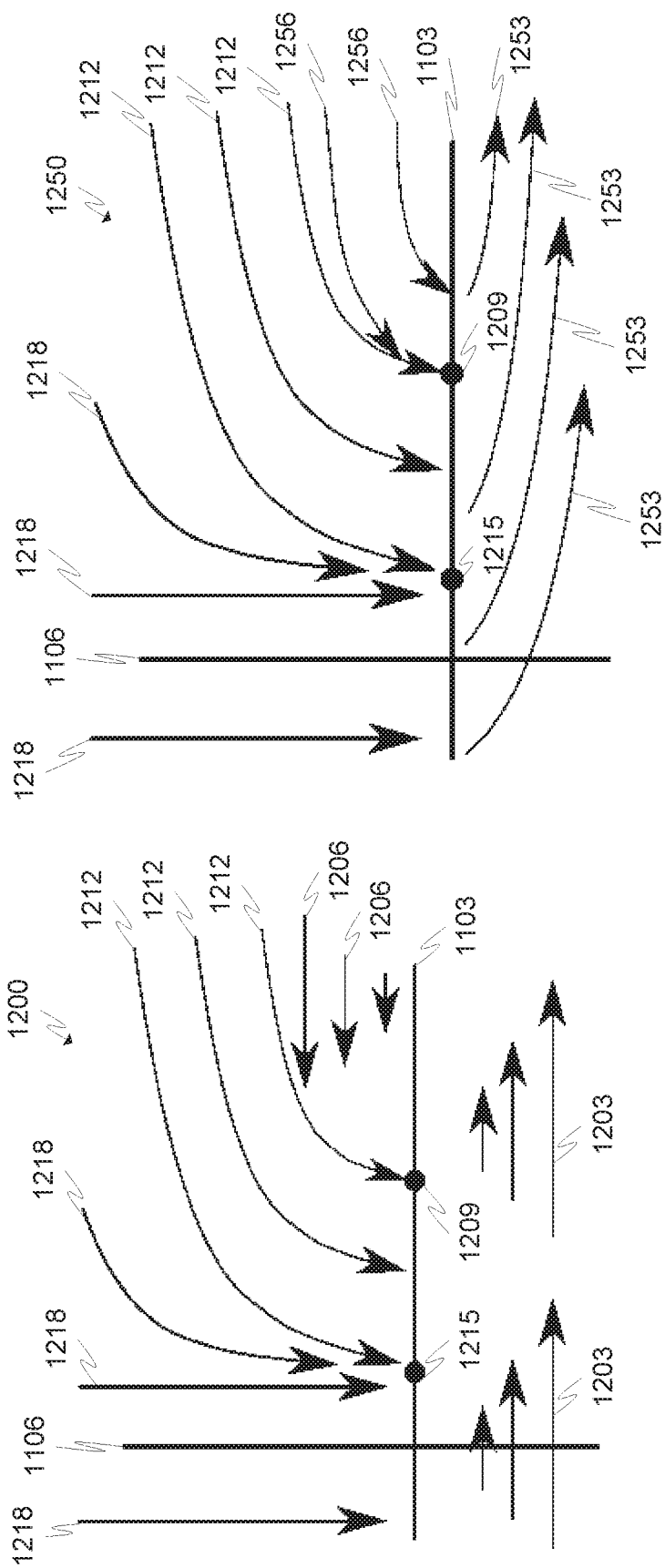

SYSTEMS AND METHODS OF AUTONOMOUSLY CONTROLLING VEHICLE LANE CHANGE MANEUVER

FIELD

The present disclosure is generally directed to vehicle systems, in particular, toward autonomously controlling a vehicle through a lane change.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new, they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

To perform properly, autonomous vehicles must take into consideration a near infinite number of variables and factors. Contemporary autonomous vehicles, however, are limited by capabilities of memory and processors. An autonomous vehicle navigating through traffic at high speeds is faced with an ever-increasing number of decisions to make despite any shortcomings of processing technology.

BRIEF DESCRIPTION OF THE DRAWINGS

FIG. 12A is an illustration of a phase plane trajectory graph in accordance with one or more of the embodiments presented herein;

FIG. 12B is an illustration of a phase plane trajectory graph in accordance with one or more of the embodiments presented herein;

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
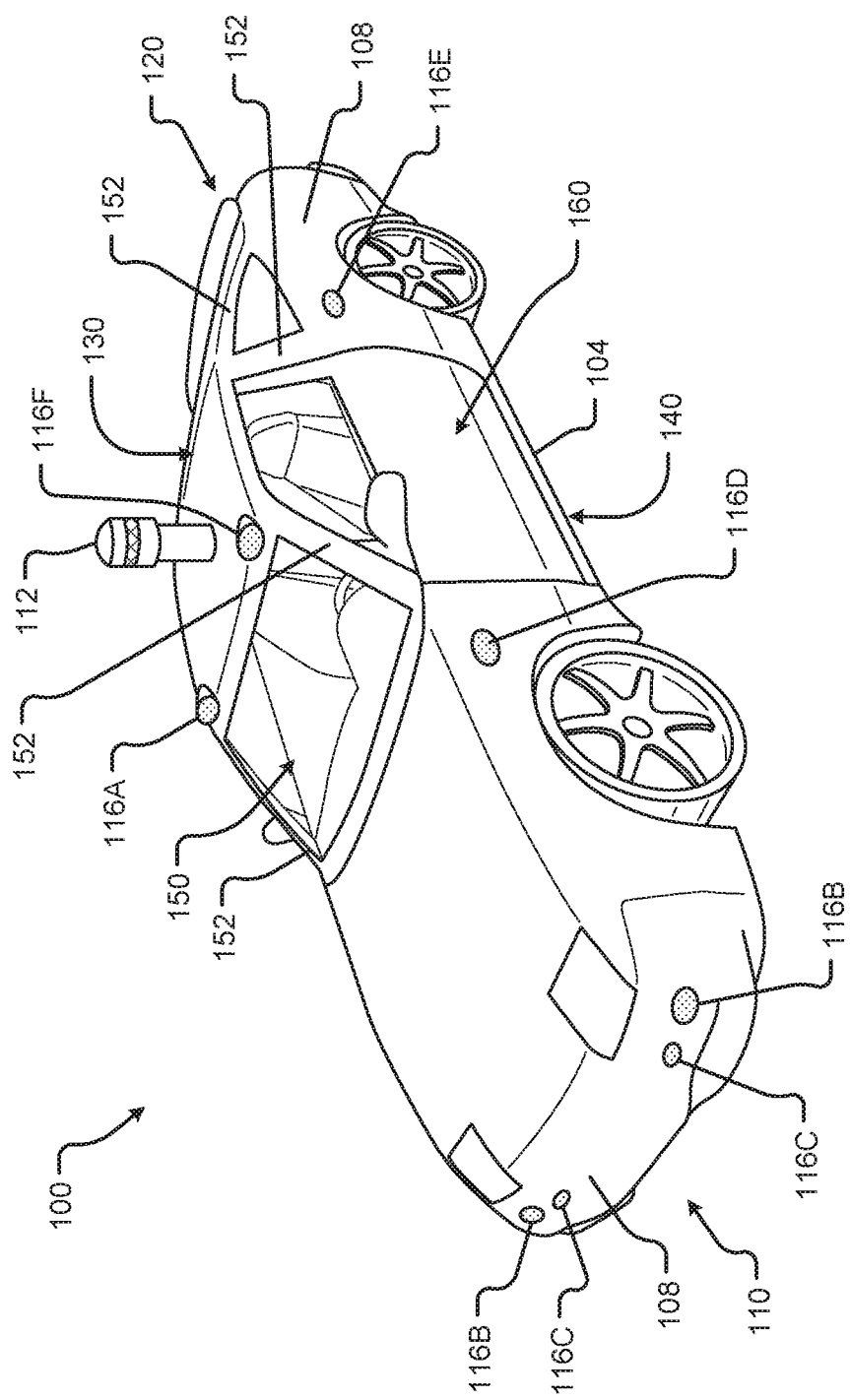
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally, or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
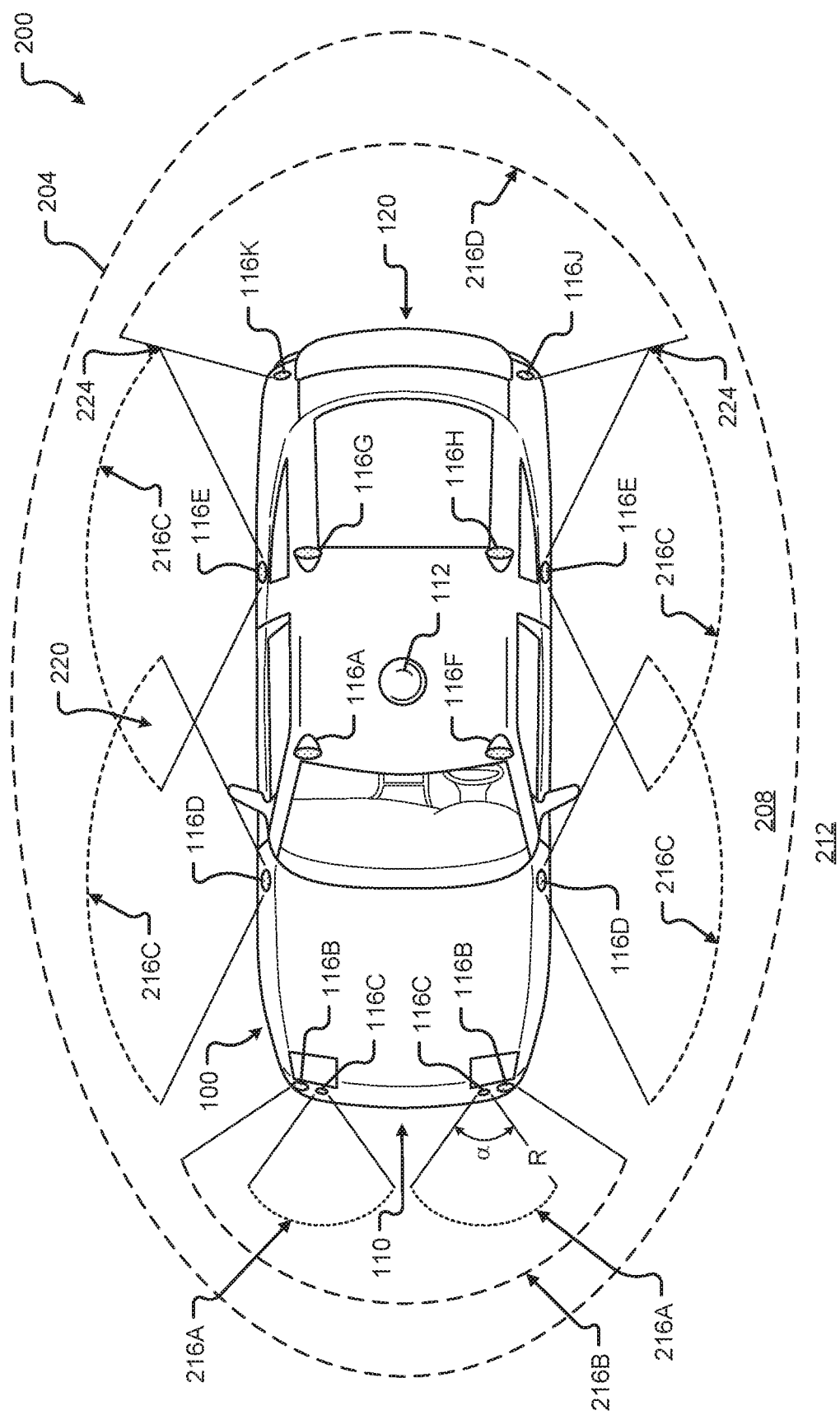
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle may define at least one angle of a span, or between horizontal and/or vertical limits, of a sensor 116A-K. As can be appreciated, the operational detection limit and the operational detection angle of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally, or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally, or alternatively, the sensors 116A-K may detect a target that is both, or simultaneously, at a side 160 and a rear 120 of the vehicle 100 (e.g., disposed at a diagonal angle to the centerline of the vehicle 100).

Figure 3A:
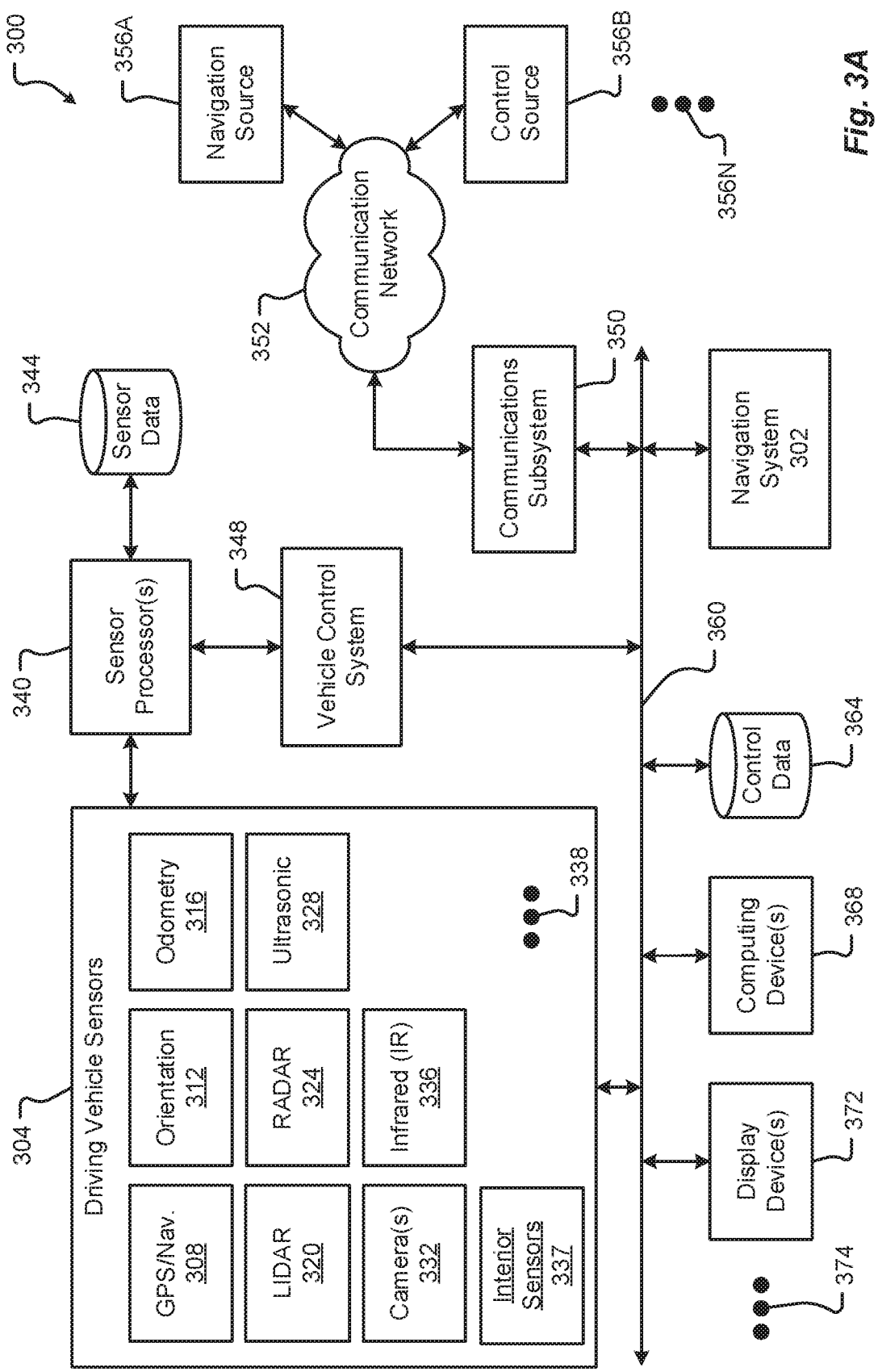
FIG. 3A is a block diagram of an embodiment of a communication environment of the vehicle in accordance with embodiments of the present disclosure.
Figure 3B:
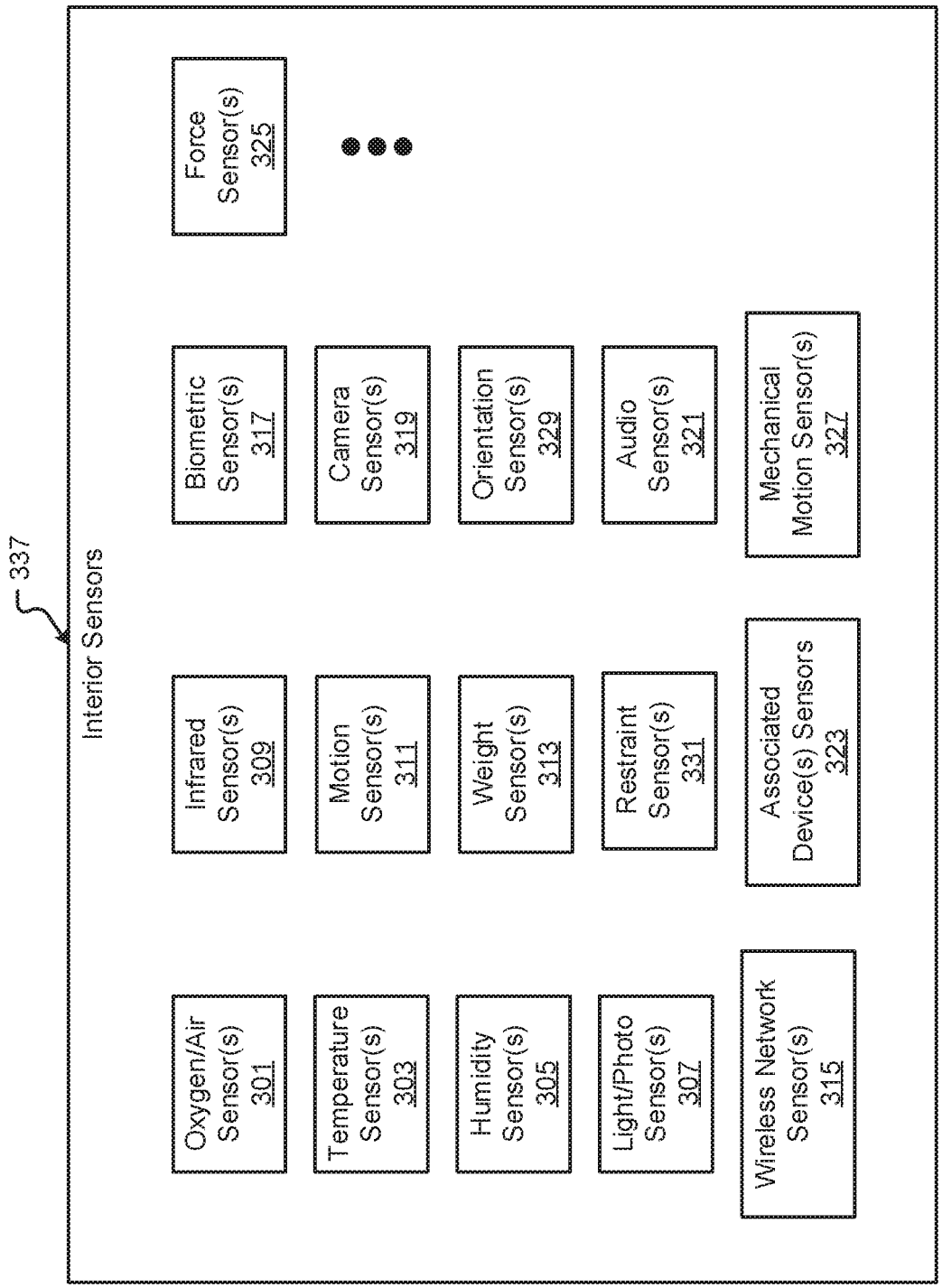
FIG. 3B is a block diagram of an embodiment of interior sensors within the vehicle in accordance with embodiments of the present disclosure.
Figure 3C:
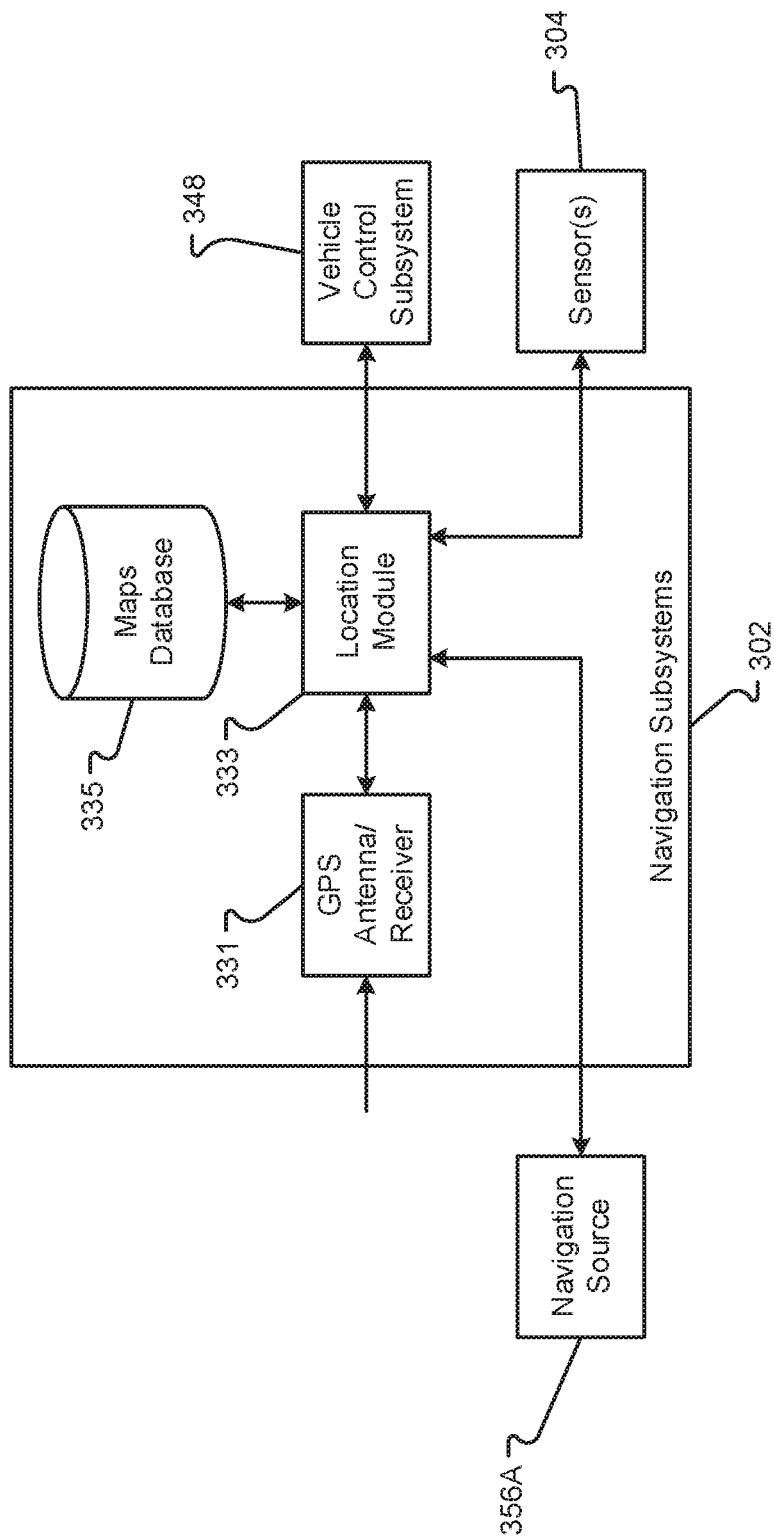
FIG. 3C is a block diagram of an embodiment of a navigation system of the vehicle in accordance with embodiments of the present disclosure.

FIGS. 3A-3C are block diagrams of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15X™ family of sensors, Garmin® GPS 16X™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally, or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Mangnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processor. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The vehicle 100 can also include one or more interior sensors 337. Interior sensors 337 can measure characteristics of the inside environment of the vehicle 100. The interior sensors 337 may be as described in conjunction with FIG. 3B.

A navigation system 302 can include any hardware and/or software used to navigate the vehicle either manually or autonomously. The navigation system 302 may be as described in conjunction with FIG. 3C.

In some embodiments, the driving vehicle sensors and systems 304 may include other sensors 338 and/or combinations of the sensors 306-337 described above. Additionally or alternatively, one or more of the sensors 306-337 described above may include one or more processors configured to process and/or interpret signals detected by the one or more sensors 306-337. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random-access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random-access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

FIG. 3B shows a block diagram of an embodiment of interior sensors 337 for a vehicle 100. The interior sensors 337 may be arranged into one or more groups, based at least partially on the function of the interior sensors 337. For example, the interior space of a vehicle 100 may include environmental sensors, user interface sensor(s), and/or safety sensors. Additionally or alternatively, there may be sensors associated with various devices inside the vehicle (e.g., smart phones, tablets, mobile computers, wearables, etc.)

Environmental sensors may comprise sensors configured to collect data relating to the internal environment of a vehicle 100. Examples of environmental sensors may include one or more of, but are not limited to: oxygen/air sensors 301, temperature sensors 303, humidity sensors 305, light/photo sensors 307, and more. The oxygen/air sensors 301 may be configured to detect a quality or characteristic of the air in the interior space 108 of the vehicle 100 (e.g., ratios and/or types of gases comprising the air inside the vehicle 100, dangerous gas levels, safe gas levels, etc.). Temperature sensors 303 may be configured to detect temperature readings of one or more objects, users 216, and/or areas of a vehicle 100. Humidity sensors 305 may detect an amount of water vapor present in the air inside the vehicle 100. The light/photo sensors 307 can detect an amount of light present in the vehicle 100. Further, the light/photo sensors 307 may be configured to detect various levels of light intensity associated with light in the vehicle 100.

User interface sensors may comprise sensors configured to collect data relating to one or more users (e.g., a driver and/or passenger(s)) in a vehicle 100. As can be appreciated, the user interface sensors may include sensors that are configured to collect data from users 216 in one or more areas of the vehicle 100. Examples of user interface sensors may include one or more of, but are not limited to: infrared sensors 309, motion sensors 311, weight sensors 313, wireless network sensors 315, biometric sensors 317, camera (or image) sensors 319, audio sensors 321, and more.

Infrared sensors 309 may be used to measure IR light irradiating from at least one surface, user, or other object in the vehicle 100. Among other things, the infrared sensors 309 may be used to measure temperatures, form images (especially in low light conditions), identify users 216, and even detect motion in the vehicle 100.

The motion sensors 311 may detect motion and/or movement of objects inside the vehicle 100. Optionally, the motion sensors 311 may be used alone or in combination to detect movement. For example, a user may be operating a vehicle 100 (e.g., while driving, etc.) when a passenger in the rear of the vehicle 100 unbuckles a safety belt and proceeds to move about the vehicle 10. In this example, the movement of the passenger could be detected by the motion sensors 311. In response to detecting the movement and/or the direction associated with the movement, the passenger may be prevented from interfacing with and/or accessing at least some of the vehicle control features. As can be appreciated, the user may be alerted of the movement/motion such that the user can act to prevent the passenger from interfering with the vehicle controls. Optionally, the number of motion sensors in a vehicle may be increased to increase an accuracy associated with motion detected in the vehicle 100.

Weight sensors 313 may be employed to collect data relating to objects and/or users in various areas of the vehicle 100. In some cases, the weight sensors 313 may be included in the seats and/or floor of a vehicle 100. Optionally, the vehicle 100 may include a wireless network sensor 315. This sensor 315 may be configured to detect one or more wireless network(s) inside the vehicle 100. Examples of wireless networks may include, but are not limited to, wireless communications utilizing Bluetooth®, Wi-Fi™, ZigBee, IEEE 802.11, and other wireless technology standards. For example, a mobile hotspot may be detected inside the vehicle 100 via the wireless network sensor 315. In this case, the vehicle 100 may determine to utilize and/or share the mobile hotspot detected via/with one or more other devices associated with the vehicle 100.

Biometric sensors 317 may be employed to identify and/or record characteristics associated with a user. It is anticipated that biometric sensors 317 can include at least one of image sensors, IR sensors, fingerprint readers, weight sensors, load cells, force transducers, heart rate monitors, blood pressure monitors, and the like as provided herein.

The camera sensors 319 may record still images, video, and/or combinations thereof. Camera sensors 319 may be used alone or in combination to identify objects, users, and/or other features, inside the vehicle 100. Two or more camera sensors 319 may be used in combination to form, among other things, stereo and/or three-dimensional (3D) images. The stereo images can be recorded and/or used to determine depth associated with objects and/or users in a vehicle 100. Further, the camera sensors 319 used in combination may determine the complex geometry associated with identifying characteristics of a user. For example, the camera sensors 319 may be used to determine dimensions between various features of a user's face (e.g., the depth/distance from a user's nose to a user's cheeks, a linear distance between the center of a user's eyes, and more). These dimensions may be used to verify, record, and even modify characteristics that serve to identify a user. The camera sensors 319 may also be used to determine movement associated with objects and/or users within the vehicle 100. It should be appreciated that the number of image sensors used in a vehicle 100 may be increased to provide greater dimensional accuracy and/or views of a detected image in the vehicle 100.

The audio sensors 321 may be configured to receive audio input from a user of the vehicle 100. The audio input from a user may correspond to voice commands, conversations detected in the vehicle 100, phone calls made in the vehicle 100, and/or other audible expressions made in the vehicle 100. Audio sensors 321 may include, but are not limited to, microphones and other types of acoustic-to-electric transducers or sensors. Optionally, the interior audio sensors 321 may be configured to receive and convert sound waves into an equivalent analog or digital signal. The interior audio sensors 321 may serve to determine one or more locations associated with various sounds in the vehicle 100. The location of the sounds may be determined based on a comparison of volume levels, intensity, and the like, between sounds detected by two or more interior audio sensors 321. For instance, a first audio sensors 321 may be located in a first area of the vehicle 100 and a second audio sensors 321 may be located in a second area of the vehicle 100. If a sound is detected at a first volume level by the first audio sensors 321 A and a second, higher, volume level by the second audio sensors 321 in the second area of the vehicle 100, the sound may be determined to be closer to the second area of the vehicle 100. As can be appreciated, the number of sound receivers used in a vehicle 100 may be increased (e.g., more than two, etc.) to increase measurement accuracy surrounding sound detection and location, or source, of the sound (e.g., via triangulation, etc.).

The safety sensors may comprise sensors configured to collect data relating to the safety of a user and/or one or more components of a vehicle 100. Examples of safety sensors may include one or more of, but are not limited to: force sensors 325, mechanical motion sensors 327, orientation sensors 329, restraint sensors 331, and more.

The force sensors 325 may include one or more sensors inside the vehicle 100 configured to detect a force observed in the vehicle 100. One example of a force sensor 325 may include a force transducer that converts measured forces (e.g., force, weight, pressure, etc.) into output signals. Mechanical motion sensors 327 may correspond to encoders, accelerometers, damped masses, and the like. Optionally, the mechanical motion sensors 327 may be adapted to measure the force of gravity (i.e., G-force) as observed inside the vehicle 100. Measuring the G-force observed inside a vehicle 100 can provide valuable information related to a vehicle's acceleration, deceleration, collisions, and/or forces that may have been suffered by one or more users in the vehicle 100. Orientation sensors 329 can include accelerometers, gyroscopes, magnetic sensors, and the like that are configured to detect an orientation associated with the vehicle 100.

The restraint sensors 331 may correspond to sensors associated with one or more restraint devices and/or systems in a vehicle 100. Seatbelts and airbags are examples of restraint devices and/or systems. As can be appreciated, the restraint devices and/or systems may be associated with one or more sensors that are configured to detect a state of the device/system. The state may include extension, engagement, retraction, disengagement, deployment, and/or other electrical or mechanical conditions associated with the device/system.

The associated device sensors 323 can include any sensors that are associated with a device in the vehicle 100. As previously stated, typical devices may include smart phones, tablets, laptops, mobile computers, and the like. It is anticipated that the various sensors associated with these devices can be employed by the vehicle control system 348. For example, a typical smart phone can include, an image sensor, an IR sensor, audio sensor, gyroscope, accelerometer, wireless network sensor, fingerprint reader, and more. It is an aspect of the present disclosure that one or more of these associated device sensors 323 may be used by one or more subsystems of the vehicle 100.

FIG. 3C illustrates a GPS/Navigation subsystem(s) 302. The navigation subsystem(s) 302 can be any present or future-built navigation system that may use location data, for example, from the Global Positioning System (GPS), to provide navigation information or control the vehicle 100. The navigation subsystem(s) 302 can include several components, such as, one or more of, but not limited to: a GPS Antenna/receiver 331, a location module 333, a maps database 335, etc. Generally, the several components or modules 331-335 may be hardware, software, firmware, computer readable media, or combinations thereof.

A GPS Antenna/receiver 331 can be any antenna, GPS puck, and/or receiver capable of receiving signals from a GPS satellite or other navigation system. The signals may be demodulated, converted, interpreted, etc. by the GPS Antenna/receiver 331 and provided to the location module 333. Thus, the GPS Antenna/receiver 331 may convert the time signals from the GPS system and provide a location (e.g., coordinates on a map) to the location module 333.

Alternatively, the location module 333 can interpret the time signals into coordinates or other location information.

The location module 333 can be the controller of the satellite navigation system designed for use in the vehicle 100. The location module 333 can acquire position data, as from the GPS Antenna/receiver 331, to locate the user or vehicle 100 on a road in the unit's map database 335. Using the road database 335, the location module 333 can give directions to other locations along roads also in the database 335. When a GPS signal is not available, the location module 333 may apply dead reckoning to estimate distance data from sensors 304 including one or more of, but not limited to, a speed sensor attached to the drive train of the vehicle 100, a gyroscope, an accelerometer, etc. Additionally or alternatively, the location module 333 may use known locations of Wi-Fi hotspots, cell tower data, etc. to determine the position of the vehicle 100, such as by using time difference of arrival (TDOA) and/or frequency difference of arrival (FDOA) techniques.

The maps database 335 can include any hardware and/or software to store information about maps, geographical information system (GIS) information, location information, etc. The maps database 335 can include any data definition or other structure to store the information. Generally, the maps database 335 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. For example, a point of interest may include speed cameras, fuel stations, public parking, and "parked here" (or "you parked here") information. The maps database 335 may also include road or street characteristics, for example, speed limits, location of stop lights/stop signs, lane divisions, school locations, etc. The map database contents can be produced or updated by a server connected through a wireless system in communication with the Internet, even as the vehicle 100 is driven along existing streets, yielding an up-to-date map.

The vehicle control system 348, when operating in L4 or L5 and based on sensor information from the external and interior vehicle sensors, can control the driving behavior of the vehicle in response to the current vehicle location, sensed object information, sensed vehicle occupant information, vehicle-related information, exterior environmental information, and navigation information from the maps database 335.

The sensed object information refers to sensed information regarding objects external to the vehicle. Examples include animate objects such as animals and attributes thereof (e.g., animal type, current spatial location, current activity, etc.), and pedestrians and attributes thereof (e.g., identity, age, sex, current spatial location, current activity, etc.), and the like and inanimate objects and attributes thereof such as other vehicles (e.g., current vehicle state or activity (parked or in motion or level of automation currently employed), occupant or operator identity, vehicle type (truck, car, etc.), vehicle spatial location, etc.), curbs (topography and spatial location), potholes (size and spatial location), lane division markers (type or color and spatial locations), signage (type or color and spatial locations such as speed limit signs, yield signs, stop signs, and other restrictive or warning signs), traffic signals (e.g., red, yellow, blue, green, etc.), buildings (spatial locations), walls (height and spatial locations), barricades (height and spatial location), and the like.

The sensed occupant information refers to sensed information regarding occupants internal to the vehicle. Examples include the number and identities of occupants and attributes thereof (e.g., seating position, age, sex, gaze direction, biometric information, authentication information, preferences, historic behavior patterns (such as current or historical user driving behavior, historical user route, destination, and waypoint preferences), nationality, ethnicity and race, language preferences (e.g., Spanish, English, Chinese, etc.), current occupant role (e.g., operator or passenger), occupant priority ranking (e.g., vehicle owner is given a higher ranking than a child occupant), electronic calendar information (e.g., Outlook™), and medical information and history, etc.

The vehicle-related information refers to sensed information regarding the selected vehicle. Examples include vehicle manufacturer, type, model, year of manufacture, current geographic location, current vehicle state or activity (parked or in motion or level of automation currently employed), vehicle specifications and capabilities, currently sensed operational parameters for the vehicle, and other information.

The exterior environmental information refers to sensed information regarding the external environment of the selected vehicle. Examples include road type (pavement, gravel, brick, etc.), road condition (e.g., wet, dry, icy, snowy, etc.), weather condition (e.g., outside temperature, pressure, humidity, wind speed and direction, etc.), ambient light conditions (e.g., time-of-day), degree of development of vehicle surroundings (e.g., urban or rural), and the like.

In a typical implementation, the automated vehicle control system 348, based on feedback from certain sensors, specifically the LIDAR and radar sensors positioned around the circumference of the vehicle, constructs a three-dimensional map in spatial proximity to the vehicle that enables the automated vehicle control system 348 to identify and spatially locate animate and inanimate objects. Other sensors, such as inertial measurement units, gyroscopes, wheel encoders, sonar sensors, motion sensors to perform odometry calculations with respect to nearby moving exterior objects, and exterior facing cameras (e.g., to perform computer vision processing) can provide further contextual information for generation of a more accurate three-dimensional map. The navigation information is combined with the three-dimensional map to provide short, intermediate and long-range course tracking and route selection. The vehicle control system 348 processes real-world information as well as GPS data, and driving speed to determine accurately the precise position of each vehicle, down to a few centimeters all while making corrections for nearby animate and inanimate objects.

The vehicle control system 348 can process in substantial real time the aggregate mapping information and models (or predicts) behavior of occupants of the current vehicle and other nearby animate or inanimate objects and, based on the aggregate mapping information and modeled behavior, issues appropriate commands regarding vehicle operation. While some commands are hard-coded into the vehicle, such as stopping at red lights and stop signs, other responses are learned and recorded by profile updates based on previous driving experiences. Examples of learned behavior include a slow-moving or stopped vehicle or emergency vehicle in a right lane suggests a higher probability that the car following it will attempt to pass, a pot hole, rock, or other foreign object in the roadway equates to a higher probability that a driver will swerve to avoid it, and traffic congestion in one lane means that other drivers moving in the same direction will have a higher probability of passing in an adjacent lane or by driving on the shoulder.

Figure 4:
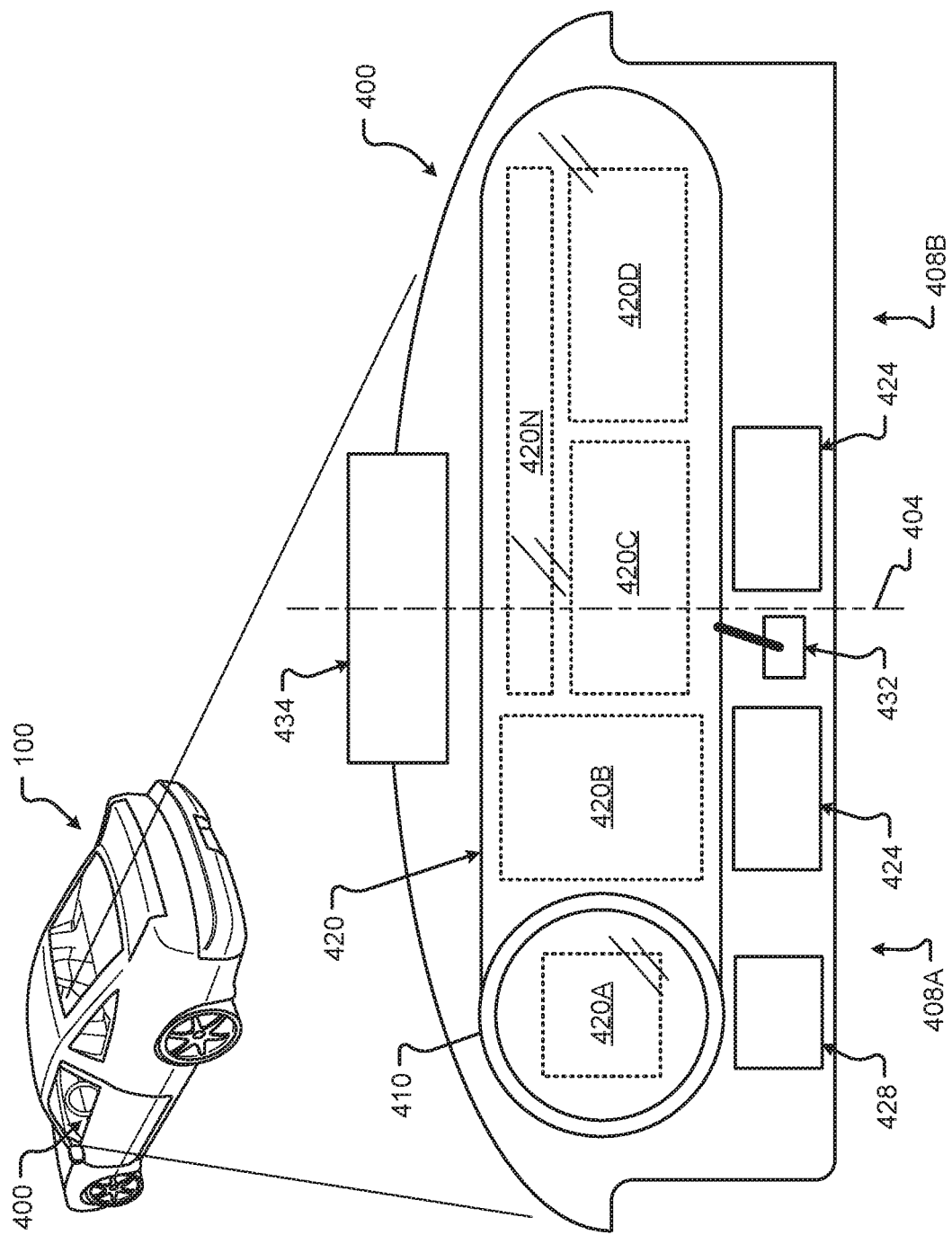
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
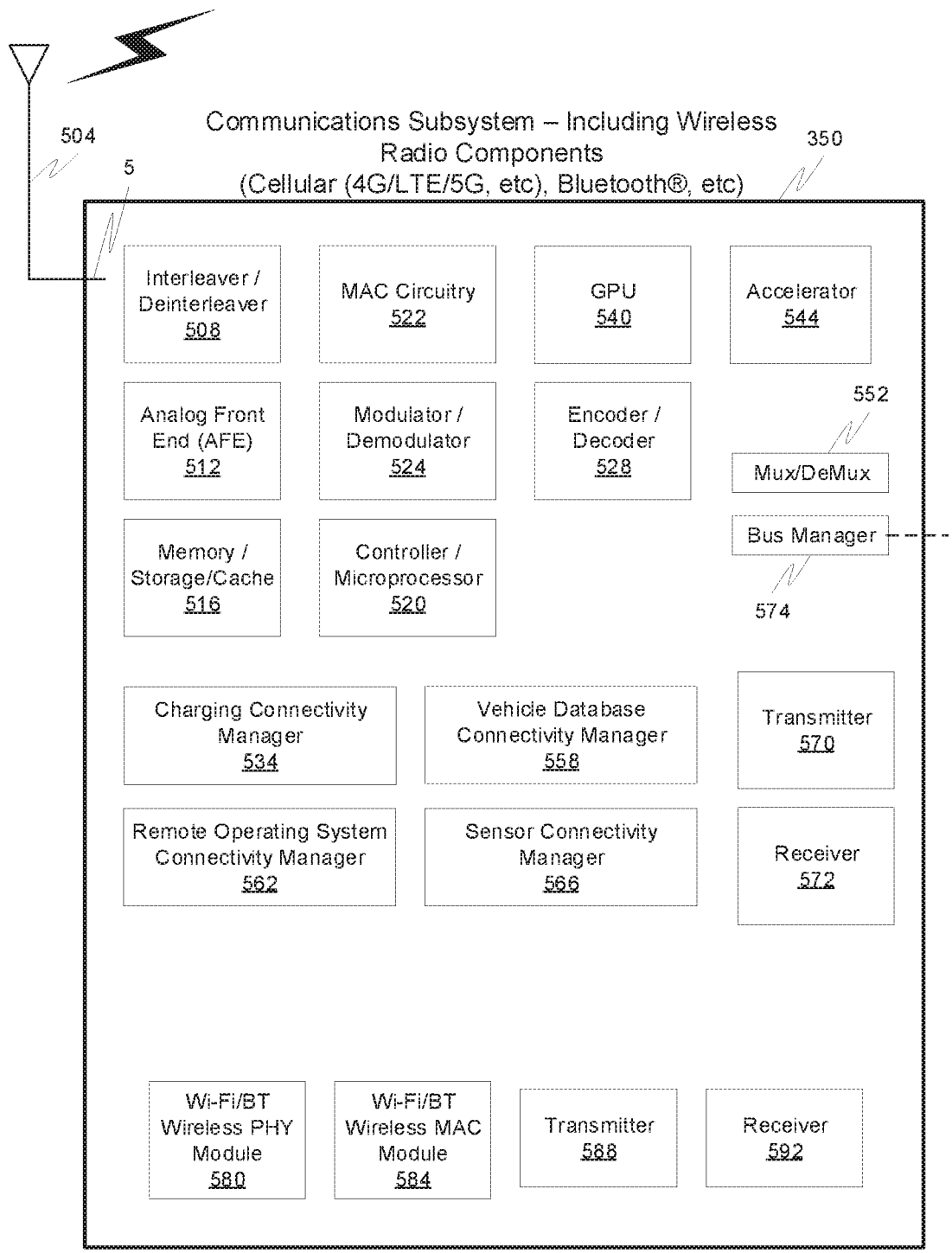
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any of the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and additional wireless radio components such as a Wi-Fi PHY/Bluetooth® module 580, a Wi-Fi/BT MAC module 584, additional transmitter(s) 588 and additional receiver(s) 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long-term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter(s) 570, 588 and receiver(s) 572, 592 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a Wi-Fi/BT/BLE (Bluetooth® Low-Energy) PHY module 580 and a Wi-Fi/BT/BLE MAC module 584 and optional wireless transmitter 588 and optional wireless receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (Internet Protocol) address(es), associated with the vehicle and one or other system or subsystems or components and/or devices therein. These identifiers can be used in conjunction with any one or more of the connectivity managers as discussed herein.

Figure 6:
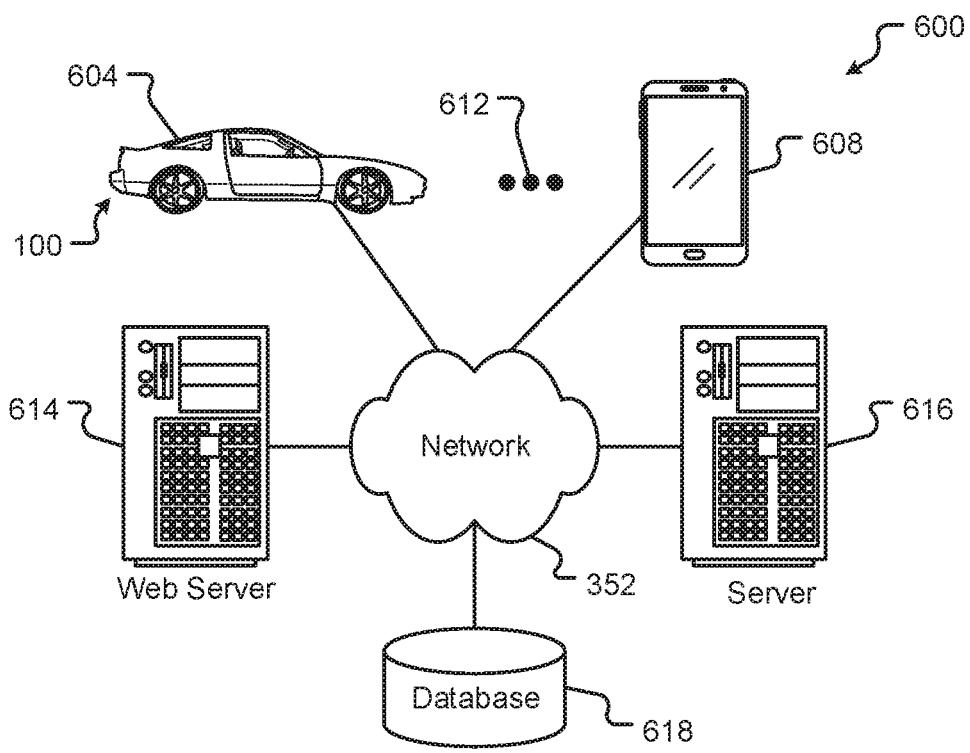
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 352 and/or displaying and navigating web pages or other types of electronic documents or information. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java® servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java®, C, C #®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 352) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
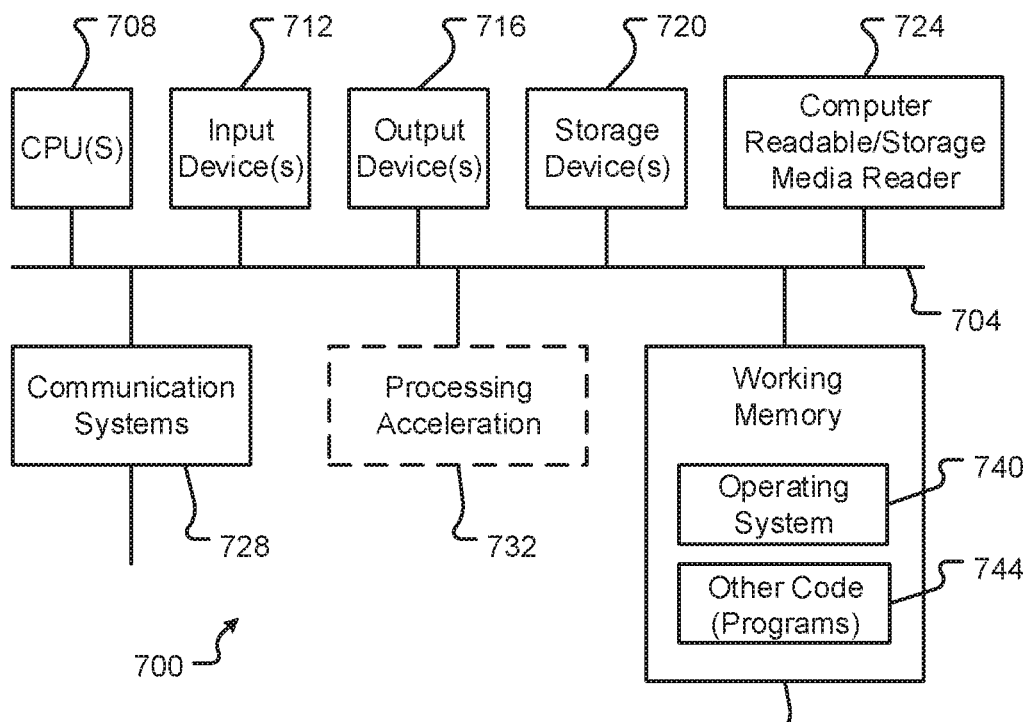
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random-access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

What is needed is a vehicle control system capable of automatically planning and executing a smooth and safe lane change. For example, an autonomous or semi-autonomous vehicle driving in multiple lanes of traffic may be capable of determining a lane change maneuver is optimal compared to a current position of the vehicle.

As used herein, ego vehicle refers to the vehicle containing the vehicle control system being described while obstacle vehicle refers to any other vehicle. Similarly, ego lane may refer to the lane in which the ego vehicle is contained.

A lane change maneuver may comprise a pre-lane change (preLC) phase in which the vehicle accelerating or decelerating in its current lane to reach an optimal position to begin merging into another lane. In the preLC phase, the optimal position may be in a range of reachable positions.

The range of reachable positions may be limited by other vehicles in the current lane. For example, the vehicle may determine a particular distance from other vehicles is required for safe operation. The range of reachable positions may be limited based on such safe following distances.

The range of reachable positions may also be limited by upper and lower limits on the acceleration of the vehicle. The lower limit may be a negative rate of acceleration, for example the vehicle may coast or slightly brake to reduce its rate of speed. The upper limit may be a positive rate of acceleration, for example the vehicle may increase its speed.

The upper and lower acceleration limits may be vehicle-dependent. The limits may depend on factors such as driver and passenger comfort and safety, road conditions, vehicle capabilities, etc.

During the preLC phase, the vehicle may determine which of the many positions within the range of reachable positions is optimal.

After reaching the optimal position in its current lane, the vehicle may begin to merge into a target lane.

A lane change maneuver may, in some embodiments, be executed in around ten seconds from the time of determining the lane change maneuver should be executed until the time the vehicle is travelling in the new lane.

As described herein, the lane change maneuver should be optimal based on a consideration of a number of factors. For example, the vehicle control system should optimize obstacle avoidance. Obstacles to avoid may comprise other moving vehicles. The vehicle may store and update a database of nearby vehicles and track data on such nearby vehicles. For example, a vehicle-obstacle database may track data associated with other vehicles including an identification of a lane in which each obstacle vehicle is travelling, a speed of each obstacle vehicle, an acceleration of each obstacle vehicle, a probability of an upcoming lane change of each obstacle vehicle, etc. The vehicle control system may also track non-moving obstacles such as street signs, construction work, fences, etc.

A lane change maneuver may also be chosen based on a speed required for the maneuver. Factors affecting an optimal speed may include, but are not limited to, other vehicles, speed limits, weather and/or driving conditions, upcoming turns according to a current route of the vehicle, ideal acceleration and/or deceleration limits, or other factors.

Figures 8A, 8B:
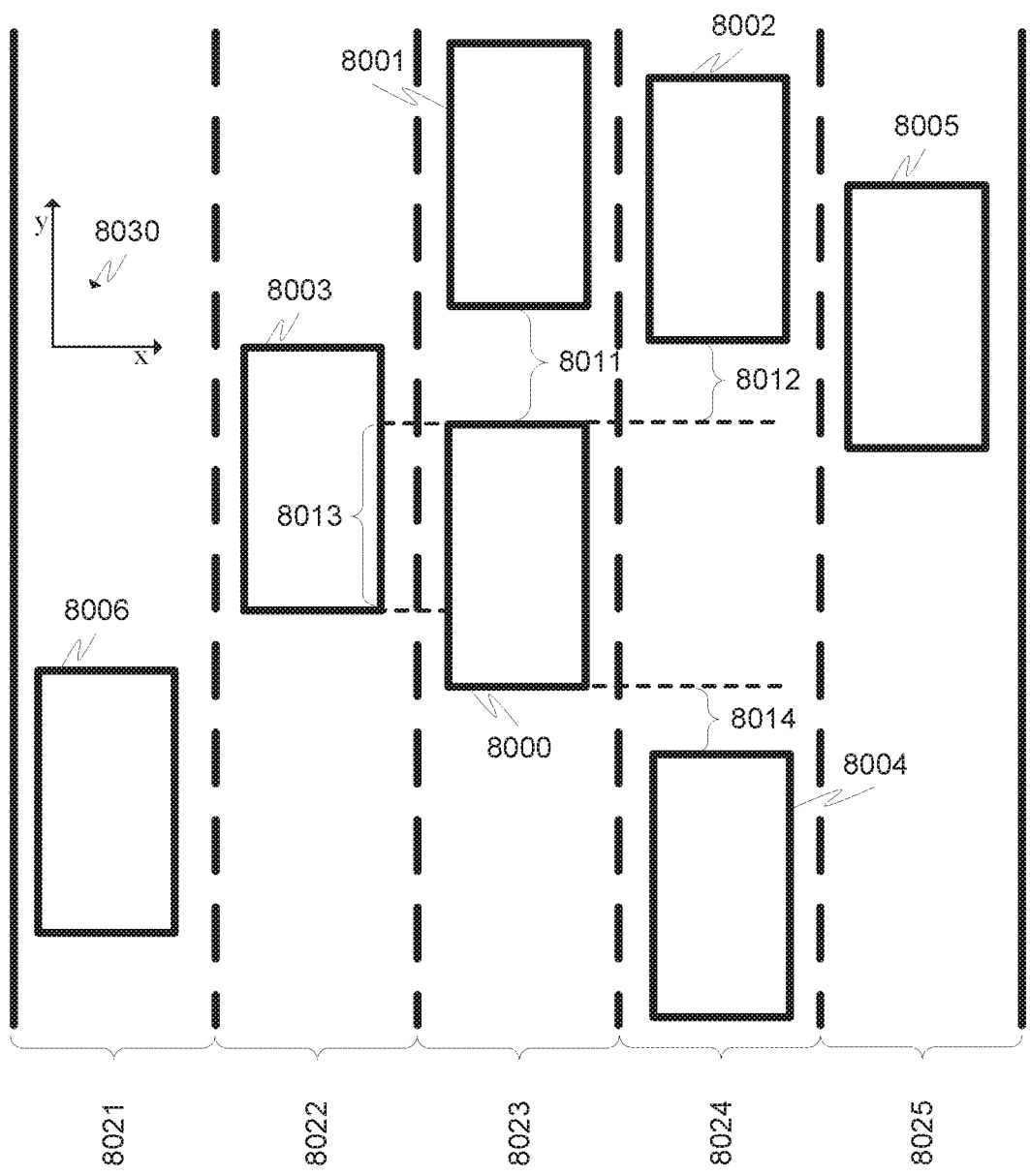
FIG. 8A is an illustration of an environment in accordance with one or more of the embodiments presented herein.
FIG. 8B is an illustration of a database in accordance with one or more of the embodiments presented herein.

Memory System:

As illustrated in FIG. 7, the vehicle control system may be in communication with a memory element such as a storage device 720 storing one or more databases. In some embodiments, a database may track one or more moving obstacle vehicles. For example, as illustrated in FIG. 8A, the ego vehicle 8000 may be driving in a third lane 8023 of a five-lane highway. As illustrated by the x/y axis 8030, the vehicles may be travelling in a+y direction. As used herein, the term longitudinal distance may refer to a distance travelled by a vehicle in a straight line parallel to the lane lines. In the example illustrated in FIG. 8A, longitudinal distance may refer to a distance parallel to the y-axis.

A number of obstacle vehicles 8001-8006 may be driving near the ego vehicle 8000 in one or more of the five lanes 8021-8025.

A goal of the vehicle control system may be to represent all possible lateral states and dynamics of the ego vehicle while conserving memory and processor requirements. To this aim, the vehicle control system may use local identifiers and measure qualities of obstacle vehicles based relative to the ego vehicle. In some embodiments, a speed of an obstacle vehicle may be measured as relative to the ego vehicle. For example, if the ego vehicle is travelling at 60 mph and a first obstacle vehicle is travelling at 62 mph, the ego vehicle may record the obstacle vehicle's speed as +2 mph.

The ego vehicle 8000 may sense information associated with one or more of the obstacle vehicles 8001-8006. For example, the ego vehicle 8000 may determine a current lane, a speed, and/or an acceleration/deceleration of an obstacle vehicle. In some embodiments, values such as current lane, speed, acceleration, etc. may be determined in comparison to the ego vehicle 8000. For example, if a first obstacle vehicle 8001 is traveling at 1% faster than the ego vehicle 8000, the ego vehicle 8000 may record the speed of the first obstacle vehicle 8001 as 1.01. Similarly, if another obstacle vehicle 8004 is traveling 5% slower than the ego vehicle 8000, the ego vehicle 8000 may record the speed of the other obstacle vehicle 8004 as 0.95.

Likewise, acceleration of obstacle vehicles 8001-8006 may be determined in comparison to the ego vehicle 8000. For example, an acceleration of 0.0 may represent a vehicle is accelerating at a same rate as the ego vehicle 8000. In some embodiments, acceleration may be measured in an actual value as opposed to as relative to the ego vehicle 8000. In some embodiments, if a first obstacle vehicle 8001 is accelerating at the same rate as the ego vehicle 8000, the ego vehicle 8000 may record the acceleration of the first obstacle vehicle 8001 as 0.0. Similarly, if a second obstacle vehicle 8002 is accelerating at a 10% greater rate than the ego vehicle 8000, the ego vehicle 8000 may record the acceleration of the other obstacle vehicle 8002 as 0.1.

The ego vehicle 8000 may also track a current lane 8021-8025 for one or more of the obstacle vehicles 8001-8006. In some embodiments, the ego vehicle 8000 may only track statistics of vehicle in the ego lane 8023 as well as the two neighboring lanes 8022, 8024. By limiting the tracked vehicles to those lanes, the memory and processor requirements for analyzing proper lane changes may be reduced. Lane identifiers used by the ego vehicle 8000 may be recorded by the ego vehicle 8000 based on a relative position of each lane to the ego vehicle 8000. For example, the ego lane 8022 containing the ego vehicle 8000 may be labelled as Lane 00. The lane 8022 to the immediate left of the ego vehicle 8000 may be referred to as Lane 10. The lane 8024 to the immediate right of the ego vehicle 8000 may be referred to as Lane 01.

In some embodiments, the ego vehicle may store data associated only with obstacle vehicles in lanes 00, 01, and 10.

The ego vehicle 8000 may also determine a location of one or more of the obstacle vehicles 8001-8006. In some embodiments, the location may simply be a determination of a distance between a nearest edge of the ego vehicle 8000 and one of the obstacle vehicles 8001-8006. For simplicity, the system may assume that any obstacle vehicle 8001-8006 occupies the total width of its lane 8021-8025. The distance may, in some embodiments, be simply a measurement along the y-axis. As illustrated in FIG. 8A, the ego vehicle 8000 may determine a distance 8011 between the front bumper of the ego vehicle 8000 and the rear bumper of the obstacle vehicle 8001 directly in front of the ego vehicle 8000. As used herein, a position of an obstacle may comprise both of a lane ID and a distance of the obstacle from the ego vehicle.

Distance of each obstacle may be measured in terms of a relative distance from the nearest edge of the ego vehicle. For example, in the case of a leading car ahead of the ego vehicle in the same lane, the position of the leading car may be measured in a distance from the front bumper of the ego car to the back bumper of the leading car. Similarly, for an obstacle in a lane adjacent to the ego lane driving ahead of the ego vehicle, the position distance of the obstacle may be measured simply in terms of the longitudinal distance from the front bumper of the ego vehicle to the obstacle.

The ego vehicle 8000 may determine a distance 8012 between the ego vehicle 8000 and an obstacle vehicle 8002 in a neighboring lane 8024. If the obstacle vehicle 8002 is at least slightly leading the ego vehicle 8000, the distance 8012 may be measured from the front bumper of the ego vehicle 8000 and the rear bumper of the obstacle vehicle 8002. The distance may, in some embodiments, be simply a measurement along the y-axis to simplify the calculations required.

Similarly, the ego vehicle 8000 may determine a distance 8014 between the ego vehicle 8000 and an obstacle vehicle 8004 behind the ego vehicle 8000 in a neighboring lane 8024. If the obstacle vehicle 8004 is at least slightly behind the ego vehicle 8000, the distance 8014 may be measured from the rear bumper of the ego vehicle 8000 and the front bumper of the obstacle vehicle 8004.

In some embodiments, if an obstacle vehicle 8003 in a neighboring lane 8022 is neither completely ahead of or completely behind the ego vehicle 8000, the ego vehicle 8000 may record the location of the obstacle vehicle 8003 as a negative number associated with the distance 8013 between the front bumper of the ego vehicle 8000 and the back bumper of the neighboring obstacle vehicle 8003.

As illustrated in FIG. 8B, a table 8040 may be stored in memory and may be actively updated during travel. The table 8040 may store data for each of the currently-monitored obstacle vehicles. To continue the example illustrated in FIG. 8A, the ego vehicle 8000 may monitor statistics for any vehicle in the ego lane 8023, the lane 8022 to the left of the ego lane 8023 and the lane 8024 to the right of the ego lane 8023. As illustrated in FIGS. 8A and 8B, the table 8040 may comprise data for each of obstacles 8001-8004. The table may store data for each of the obstacles 8001-8004 such as an obstacle ID, a lane ID of a lane containing each obstacle, a relative speed, a relative rate of acceleration, a relative distance, and an indicator as to whether the distance is measured from the front or rear/back bumper of the ego vehicle 8000.

Figures 8C, 8D:
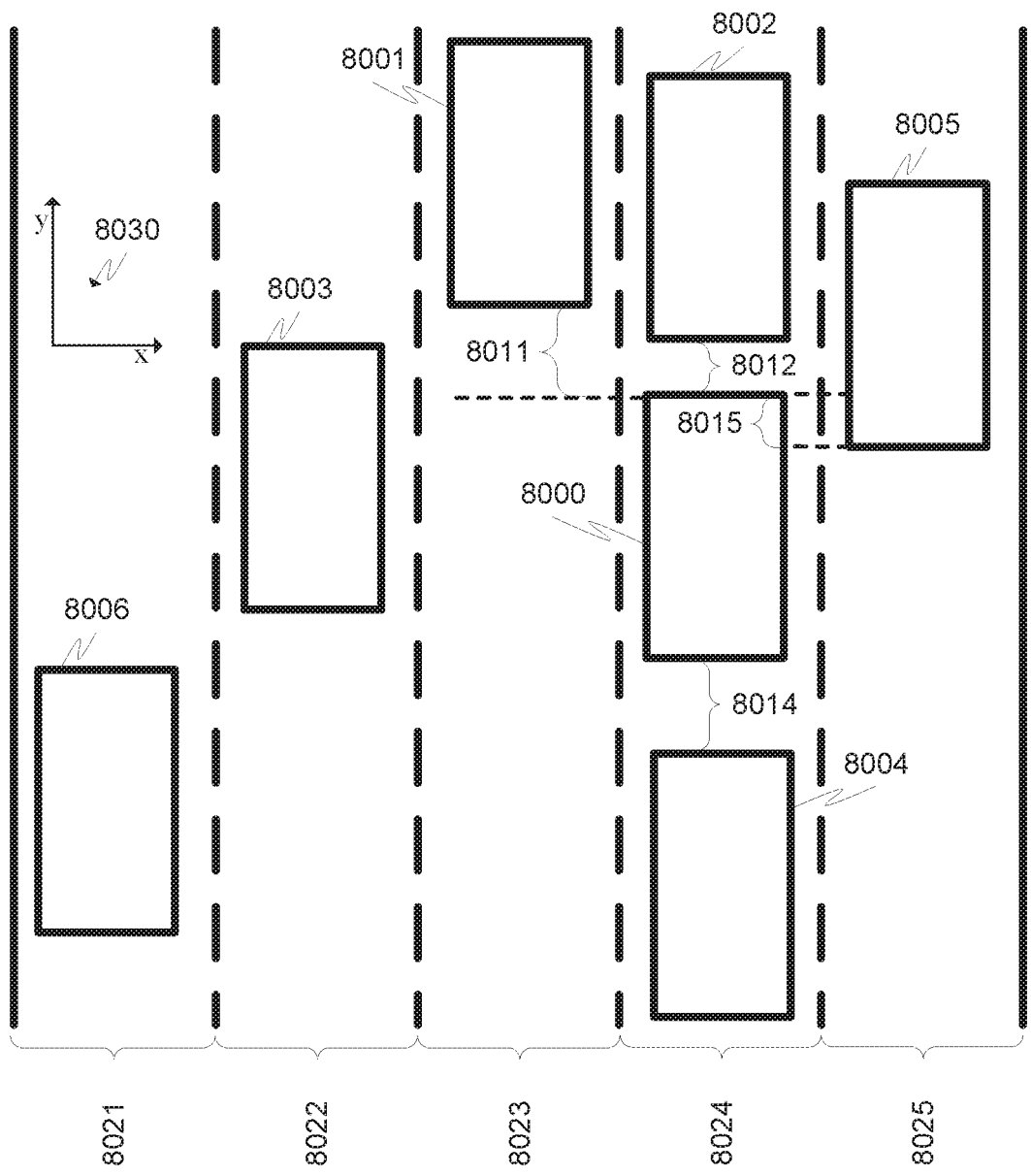
FIG. 8C is an illustration of an environment in accordance with one or more of the embodiments presented herein.
FIG. 8D is an illustration of a database in accordance with one or more of the embodiments presented herein.

As illustrated in FIGS. 8C and 8D, in the event of the ego vehicle 8000 changing lanes from what was the ego lane 8023 to a new ego lane 8024, the database 8040 may update as illustrated by the database 8041 in FIG. 8D. For example, all obstacles in what was the ego lane will transfer to the non-chosen lane. The new ego lane obstacles can be moved into the ego lane. Changing lanes may result in the vehicle control system ceasing to monitor vehicles in lanes which are no longer the ego lane or a neighboring lane. As illustrated in FIG. 8C, the ego vehicle 8000 may monitor vehicles in lanes 8023-8025. Thus, a move from a first lane 8023 to a second lane 8024 may result in continuing to monitor vehicles in the first land 8023 and the second lane 8024 while ceasing to monitor obstacle vehicles in the previously left lane 8022 and beginning to monitor obstacle vehicles in what is now the right lane 8025.

As illustrated by FIGS. 8C and 8D, the ego vehicle 8000 may cease to monitor the obstacle vehicle 8003 in what was the left lane 8022 and may begin to monitor the obstacle vehicle 8005 in what is now the right lane 8025. The distance between the ego vehicle 8000 and the obstacle vehicle 8005 may be measured as a negative distance 8015 between the front bumper of the ego vehicle 8000 and the rear bumper of the obstacle vehicle 8005 as the obstacle vehicle 8005 is slightly leading the ego vehicle.

The table 8040 of FIG. 8B may be updated based on the change in Lane IDs and the change in monitored obstacle vehicles as illustrated by the updated table 8041 in FIG. 8D. As can be appreciated, the previous ego lane 8023 was assigned lane ID 00. After the lane change, the lane 8023 may change to lane ID 10 to reflect the fact that the lane 8023 is now the left lane as opposed to the ego lane.

Lane Change Phases:

A vehicle control system may be capable of determining when a lane change maneuver may be optimal given a situation and circumstances. A vehicle control system may determine maneuvering the vehicle through the changing of a lane may be preferable given the vehicle's current status. For example, if the vehicle is following behind an obstacle vehicle travelling at a less than optimal rate of speed, the vehicle control system may determine moving the vehicle into another lane may be preferred.

The vehicle control system may also be capable of automatically carrying out a lane change maneuver. For example, the vehicle control system may determine a specific moment to initiate the lane change, which lane to travel into, and at what speed to carry out the lane change.

In order to automate the process of changing lanes, the vehicle control system may analyze the lane change maneuver in three phases: a pre-lane change (preLC) phase, a lane change (LC) phase, and a post-lane change (postLC) phase.

The preLC phase may be prior to a lane change initiation time. The lane change initiation time may be the point at which the vehicle begins to merge into a neighboring lane. During the pre-lane change phase, the ego vehicle may be entirely within its current lane, or ego lane. The analysis performed by the vehicle control system during the preLC phase may involve positioning the ego vehicle into the proper spot for the lane change to initiate at the initiation time, t, and at the proper speed and acceleration to optimally change lanes. Movement of the ego vehicle during the preLC phase may ignore the location of obstacle vehicles in other lanes.

The goal of the vehicle control system during the preLC phase may be to position the ego vehicle into the proper spot for the lane change to initiate at the initiation time, t, and at the proper speed and rate of acceleration to optimally change lanes.

In some embodiments, the preLC phase may begin at a time t_lc_start and end at an initiation time, t.

The LC phase may be during the period of time in which the ego vehicle occupies a portion of two lanes simultaneously. The movement of the ego vehicle during the LC phase may be limited by the positions of vehicles in both the ego lane and the target lane. For example, the ego vehicle may maintain a safe following distance from the nearest leading vehicle in the ego lane as well as the nearest leading vehicle in the target lane.

The LC phase may last from the time the ego vehicle enters the target lane until the point in time that the ego vehicle leaves the ego lane.

The postLC phase may begin at the point in which the ego vehicle is entirely within the target lane, at which point the target lane may become the new ego lane).

Parameters of the Lane Change Maneuver or Motion Plan:

In order to execute a lane change maneuver, the vehicle control system may generate a motion plan for the vehicle to follow. A motion plan may, in some embodiments, be fully parameterized by: a lane id of a target lane (which may be 01 or 10), a start and end time of the lane change (t_lc_start and t_lc_end); longitudinal kinematics (speed profile) over the time frame; and other geometry factors, such as lateral position, heading, curvature, etc.

In some embodiments, a vehicle may have an optimal maximum and an optimal minimum acceleration for a lane change maneuver. The optimal maximum and minimum rates of acceleration may be determined based on a number of factors, such as safety, comfort, etc. Note that the optimal maximum acceleration may not be the total possible maximum acceleration of the vehicle and the optimal minimum acceleration may not be the total possible minimum acceleration (which would be hitting the brakes to slow the vehicle as quickly as possible). For a lane change maneuver, the optimal minimum acceleration may be a gentle pressing of the brakes.

In order to generate an optimal motion plan, the vehicle control system may execute a lane change maneuver generation method comprising a number of steps. The lane change maneuver generation method may comprise first considering a range of potential lane change initiation times, t. The lane change maneuver generation method may next comprise, for a plurality of potential lane change initiation times, t, within the range, sampling all reachable longitudinal states of the vehicle. A reachable longitudinal state may comprise a distance travelled from the present time to the initiation time, a speed at initiation time, and an acceleration rate at initiation time. The lane change maneuver generation method may next comprise, for a plurality of the reachable longitudinal states, computing a speed profile required to reach the reachable longitudinal state and computing an ensuing trajectory of the vehicle following the initiation time.

Overall System:

Consider a range of potential lane change initiation times t.

The initiation time, t, is a time at which the ego vehicle begins to move into the target lane. The time at which the ego vehicle begins to occupy both the ego lane and the target lane.

The initiation time, t, is not the beginning of the lane change maneuver. The ego vehicle, prior to time t, will first go through a pre-lane change (preLC) phase in which it will position itself at a proper position to initiate the lane change (LC) phase.

The range of initiation times may be, for example, between 2 seconds and ten seconds. The range may be split into particular time intervals, such as 0.1 seconds. Therefore, a range of [2:10] could have interval times at 2.0, 2.1, 2.2 . . . 10.0.

Sample reachable longitudinal states at each initiation time interval within the range of potential lane change initiation times.

The goal is to find all positions within the ego lane that the ego vehicle can reach during the lane change maneuver before initiating a lane change.

This creates a "closed loop" in which the vehicle can reach any point within the loop. The points of the loop may be reached by either accelerating or decelerating constantly through the maneuver. Any other position within the loop may be reached by a combination of accelerating and decelerating throughout the maneuver.

Figure 9A:
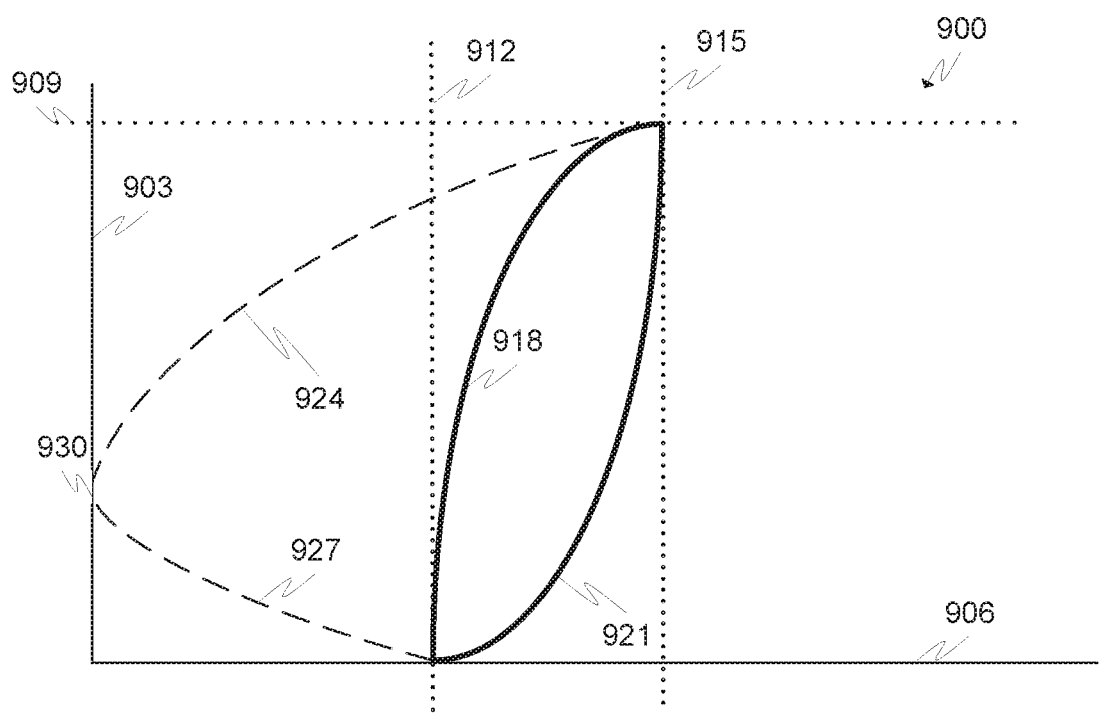
FIG. 9A is an illustration of potential reachable states in accordance with one or more of the embodiments presented herein.

As illustrated in FIG. 9A, all reachable longitudinal states for a given time of initiation may be illustrated by a closed loop as plotted on a graph with axes for speed and distance of the vehicle. In the plot 900 of FIG. 9A, a y-axis 903 may plot the ego vehicle's speed while an x-axis 906 may represent a vehicle's distance travelled from a beginning time, 0, to a given initiation time, t. The initial position of the ego vehicle may be represented by a point 930 at a zero distance on the distance axis 906 and at an initial speed on the speed axis 903.

For example, the ego vehicle's initial state may be represented by a point 930 at [0; 27], representing a distance of zero and an initial speed of 27 m/s. For a given time of initiation, say 4 seconds, there may be a particular range of possible, or reachable, states for the vehicle at the time of initiation given the vehicle's initial state.

The minimum distance 912 travelled by the ego vehicle may be reached by the vehicle decreasing its speed at a minimum acceleration (or maximum deceleration) for the entire time frame from t=0 to t=4. The path of the vehicle along this minimum acceleration route is illustrated by the dashed line 927 of FIG. 9A. Upon reaching the minimum distance 912 at 4 seconds, the ego vehicle may be travelling at the speed shown at the distance axis 906. For example, the line 906 may illustrate a speed of 20 m/s.

The maximum distance 915 travelled by the ego vehicle may be reached by the ego vehicle increasing its speed at a maximum acceleration for the entire time frame from t=0 to t=4. The path of the vehicle along this maximum acceleration route is illustrated by the dashed line 924 of FIG. 9A. Upon reaching the maximum distance 915 at 4 seconds, the ego vehicle may be travelling at the speed shown at the dotted line 909. For example, the dotted line 909 may illustrate a speed of 38 m/s.

A reachable longitudinal state may be described by the longitudinal distance travelled, x, the speed, dx, and a lane ID. The kinematics may be bounded by a maximum acceleration U MAX and a minimum acceleration U MIN (alternatively a maximum deceleration). At any future time, t, there is an ellipse of reachable longitudinal states $[x_t; dx_t]$ which may be reached from an initial condition $[0; dx_0]$.

For example, as illustrated in FIG. 9A, consider a vehicle travelling at 28 meters per second (m/s). The control system may determine all possible states for the vehicle after two seconds of travelling. The parameters include starting speed (27 in this example), starting position (0 in this example), minimum acceleration ($u_{MIN}$=−1 in this example), and maximum acceleration ($u_{MAX}$=3 in this example).

For an initiation time of 4 seconds from the present time, the two extremes of the possible travel distance of the vehicle can be reached if the vehicle either accelerates at $u_{MAX}$ (and reaches a farthest possible distance) or at $u_{MIN}$ (and travels the least possible distance). These possibilities are illustrated by the two endpoints of the figure.

In addition to the distance traveled, the control system may also determine the speed at which the vehicle will be travelling upon reaching the distance. For example, in order for the vehicle to reach the maximum distance, the vehicle will also resultingly be travelling at the fastest speed of all possibilities upon reaching the maximum distance. Likewise, in order for the vehicle to reach the minimum distance, the vehicle will also resultingly be travelling at the slowest speed of all possibilities upon reaching the minimum distance.

The shape outlined by lines 918 and 921 illustrated in FIG. 9A shows all possible states (speed and distance from origin) reachable by the vehicle given a particular initiation time (4 seconds in the illustrated example).

As can be appreciated from the FIG. 9A, if the ego vehicle decelerates at the minimum acceleration $u_{MIN}$, the ego vehicle will travel a distance of 912 and upon reaching the distance 912 be at a speed of 20 m/s.

All reachable states for the initiation time of 4 seconds may be within the shape illustrated by lines 918 and 921.

Figure 9B:
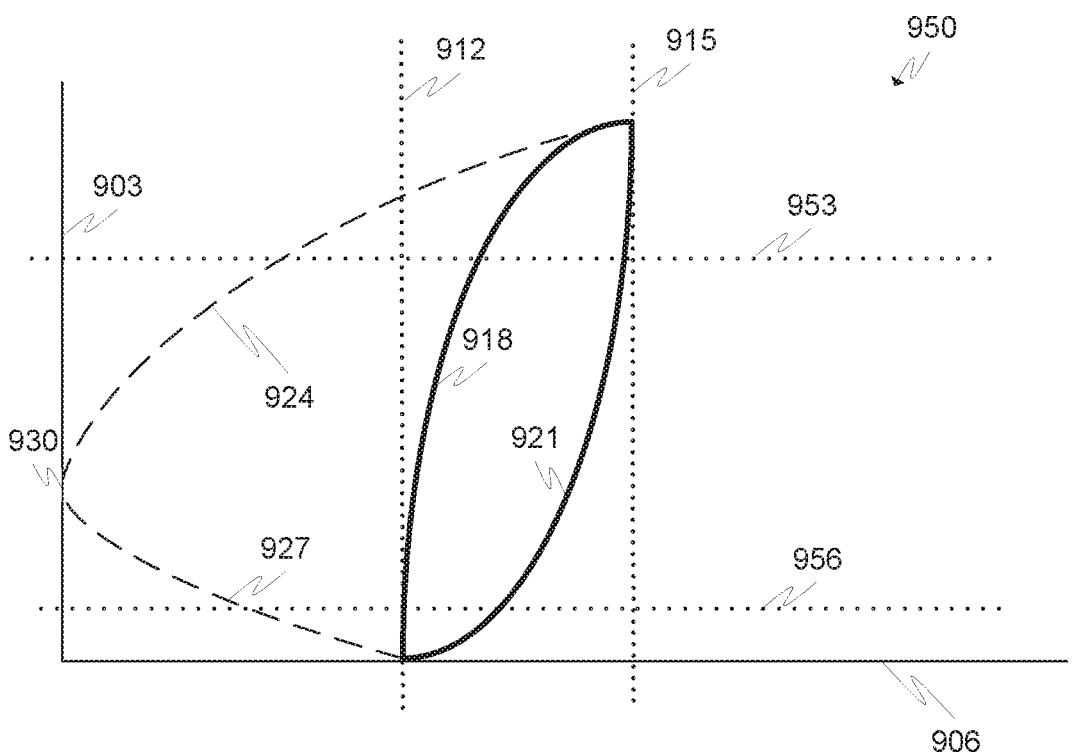
FIG. 9B is an illustration of potential reachable states in accordance with one or more of the embodiments presented herein.

In some embodiments, the control system may factor in limits on speed. For example, an upper limit may be set based on a speed limit. A lower limit may be set based on a minimum speed. As illustrated in FIG. 9B, these limits may be used to reduce the possible reachable longitudinal states which need to be analyzed.

Figure 10:
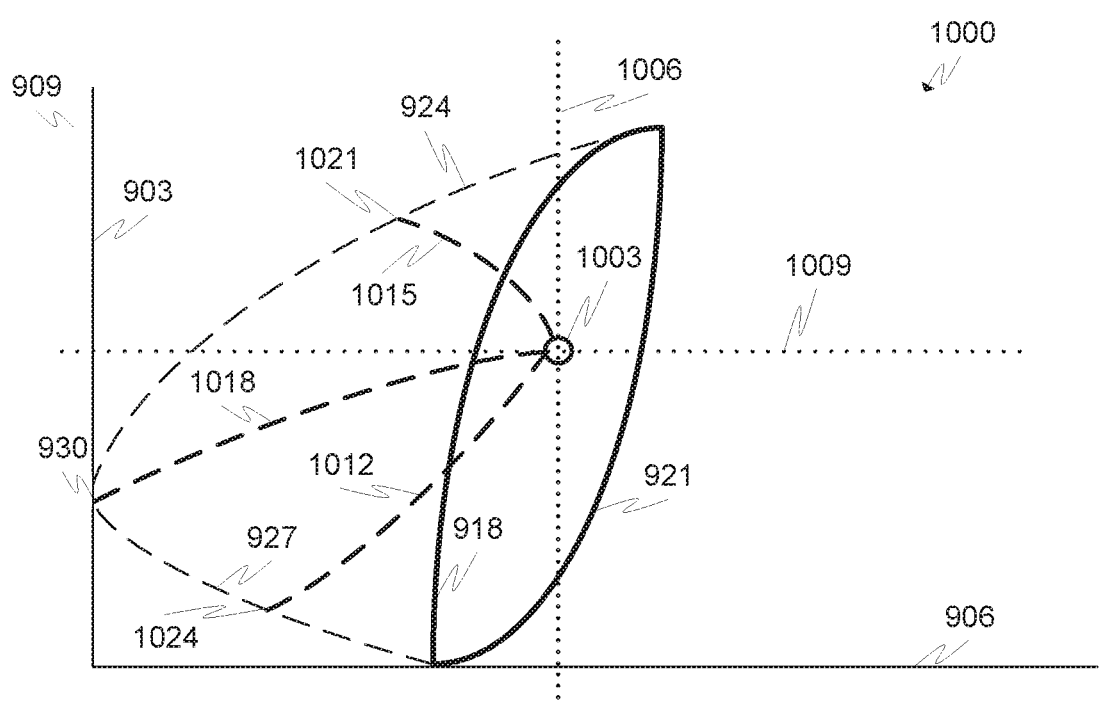
FIG. 10 is an illustration of potential reachable states in accordance with one or more of the embodiments presented herein.

For each reachable longitudinal state, identify an associated speed profile to reach the state may be identified as illustrated in FIG. 10.

The control required to reach a position within the closed loop may be called a speed profile. The speed profile may comprise a start time, an end time, a start acceleration amount, and an end acceleration amount.

In some embodiments, a "bang-bang" speed profile may be used. In a bang-bang speed profile, the vehicle may simply start at either the maximum or minimum acceleration and at a point in time between the start time and the end time may switch to the other of the maximum or minimum acceleration.

For reachable states other than the two endpoints (which are simply travelling at $u_{MAX}$ or $u_{MIN}$ until the initiation time), there is an infinite number of possible speed profiles. For example, as illustrated in FIG. 10, to reach the point 1003, the vehicle may start at $u_{MAX}$ for a period of time and switch to $u_{MIN}$ at a particular time until reaching the longitudinal state. This trajectory may be as illustrated by the switching point 1021 of FIG. 10. Alternatively, the vehicle may start by coasting for a period of time and switching to $u_{MIN}$ at a particular time until reaching the longitudinal state. The vehicle may also simply slowly accelerate along a trajectory 1018 until reaching the point 1003. Or may begin at $u_{min}$ before switching 1024 to $u_{max}$ until reaching the point 1003. Essentially any possible acceleration and/or deceleration within the range of $u_{MAX}$ and $u_{MIN}$ could result in the vehicle reaching the desired longitudinal state. Such speed profiles may be represented by simply an initial acceleration, a final acceleration and a time to switch between initial and final acceleration. For example, $[u_0; u_1; t_s]$, wherein $u_0$ is the goal acceleration for the first time period, $u_1$ is the goal acceleration for the second time period, and $t_s$ is the point in time to switch between $u_0$ and $u_1$. Alternatively, or additionally, the representation may also include a time $t_i$ to begin the maneuver, and a time $t_e$ to end the maneuver, wherein $t_e$ would be the time of arriving at the longitudinal state.

Because there may be an infinite number of possible speed profiles which could result in the vehicle reaching the desired longitudinal state, it may be necessary or desirable to reduce the possible speed profiles to a select one or more types. Types of speed profiles may comprise one or more of: U MAX for a period of time before switching to U MIN; U MIN for a period of time before switching to U MAX; coasting for a period of time before switching to one of U MAX and U MIN; one of U MIN and U MAX for a period of time before switching to U MIN; a constant acceleration or deceleration at an acceleration between U MIN and U MAX; where u0 and u1 are between U MAX and U MIN, u0 for a period of time before switching to U1; coasting for a period of time before switching to u0; and/or it may be a set of three periods of different accelerations.

For example, u1 for a first period of time, u2 for a second period of time, and u3 for a third period of time. In some embodiments, a speed profile may comprise accelerating for a period of time, coasting for a second period of time, and either accelerating or decelerating for a third period of time until the vehicle has reached the target state.

Again, while there may be an infinite number of possibilities, it is possible to reach any state even if the speed profile is limited to U MAX for a period of time before switching to U MIN (or vice versa). By simplifying it to only one of these speed profiles, e.g., U MAX for a first period of time before switching to U MIN for a second period of time, wherein one of the first and second periods of time may be zero, any possible state can be reached while the processor requirements may be limited to a minimum.

Depending on processor and memory capabilities, a range of possible speed profiles may be considered. An optimal speed profile, based on factors such as passenger comfort, safety, fuel efficiency, weather, road conditions, etc., may be determined.

The control system may determine each reachable longitudinal state (speed and distance travelled) for each time interval within the range of possible initiation times. For example, the control system may calculate a loop as illustrated in FIG. 9A for each of 2.0, 2.1, 2.2, 2.3, . . . , 9.8, 9.9, and 10.0 seconds.

To simplify and reduce the number of required calculations, states may be sampled at particular intervals, for example, states at least 3% apart from each other on the graph. For example, a field of evenly spaced dots may be overlaid on the possible states. The states may be on intervals according to one or more of distances (e.g. every half-meter) and/or speeds (e.g. every half-meter/second). In some embodiments, in addition to sampling evenly spaced points of the reachable longitudinal state loop, other particular points may be sampled, such as the maximum distance, minimum distance, a neutral point (in which the vehicle simply coasts for the entire time period), and/or other points.

For each reachable longitudinal state, compute an ensuing trajectory from the state into each of the three possible target lanes (left, ego, right)—these are the possible lane change maneuvers.

These steps allow the control system to avoid exponentially growing (dynamic-programming style) the explicit search space via expanding control actions (accelerate and decelerate) at sequential points in time. Each assumption of being able to solve for the speed profile given a target (whether the target is a point in the reachable set or the target is a lead vehicle) implicitly prunes the search space by eliminating all other maneuvers for the same conditions.

Fairly simple formulas may be used to calculate position and velocity of the vehicle. For example, $$x(t) = x_0 + dx_0 t + (a/2)t^2,$$

$$dx(t) = dx_0 + at$$

As can be appreciated from the formulas, the distance travelled of the vehicle may be determined by the initial location plus the velocity multiplied the amount of time travelled plus the acceleration multiplied by the amount of time squared and divided by two. The velocity of the vehicle may similarly be calculated by adding the initial velocity plus the acceleration multiplied by the amount of time.

Such formulas may allow for quantities like minimum distance and squared state error to be calculated while keeping calculations and computing requirements minimal. Such formulas may be capable of representing a broad class of continuous speed profiles.

For each reachable longitudinal state, the system controller may compute a speed profile associated with potential longitudinal kinematics for both the lane change phase and the post-lane change phase. These kinematics may be based on vehicles ahead of the ego vehicle. For example, the vehicle control system may compute the speed profile in order to follow at or near an optimal following distance behind one or both of a leading vehicle in the ego lane and a leading vehicle in the target lane.

One additional goal may be to account for any predictable braking of the leader vehicle in the target and/or ego lane. This accounting could be predicated based on slower or stopped obstacles further ahead. To do this, the vehicle control system may create a virtual immediate leader. This virtual immediate leader may have a position matching the real immediate leader while having a speed matching the slowest leader in the target lane. This may result in a conservative closed-loop behavior in which the ego vehicle may brake early in the sense that it is modeling a leader whose speed has instantaneously dropped to match any slower traffic ahead. While this assumption may introduce a sub-optimality in the closed loop behavior, it may allow for relatively simple algorithmic calculations and save computational power of the vehicle control system for other tasks.

The vehicle control system may also estimate a possibility of obstacles changing lanes during the lane change maneuver. Such an estimation may be based on a history of a particular obstacle's deviation from a centerline of the lane containing the obstacle. The lane-obstacle database may store for each obstacle, in addition to a current position and current speed, a prediction of the obstacle changing lanes. The prediction of the obstacle changing lanes may comprise an estimated time of the lane change occurring.

Using an obstacle's current position, velocity, and estimated time of changing lanes, the vehicle control system may be capable of determining:

A time at which the obstacle begins to occupy its target lane (e.g. 3 seconds);

A time at which the obstacle ceases to occupy its current lane (e.g. 4 seconds); and/or A position and velocity of the obstacle upon entering its target lane (e.g. [30 m; 10 m/s]).

This information may be loaded into a crude world model by the vehicle control system by defining the obstacle twice, once for each lane. In the obstacle's left lane, the obstacle may have a start time $t_0=0$, coordinates of [0; 10] ([location; speed]), and an end time of $t_{end}=4$. In the obstacle's target lane, the obstacle may have a start time $t_0=3$, coordinates of [30; 10] ([location; speed]), and an end time of $t_{end}=$infinity. In order to simplify the calculations and memory needed, the two instances of the obstacle may not be explicitly connected and may simply be interpreted as two independent obstacles.

In the event that an obstacle vehicle has an inconsistent speed, the vehicle control system may assign the obstacle a piecewise constant acceleration speed profile. For example, if obstacle A in lane 10 is travelling quickly (starting at [x=10 m; dx=15 m/s]) and obstacle B is stopped in front of obstacle A in lane 10 a long distance away ([x=200 m; dx=0 m/s]), the vehicle control system may respond in one of a number of ways, for example:

The vehicle control system may compute a speed profile that brakes as if the obstacle A has also come to an immediate stop. Note that in some instances this reaction may not be entirely appropriate as there may be room for both the obstacle A and the ego vehicle to gradually brake.

In some embodiments, the vehicle control system may otherwise compute a piecewise constant deceleration speed profile of the obstacle A, i.e., estimating that Obstacle A will gradually slow down. This may be computed in similar ways to computing a speed profile for the ego vehicle based on leading vehicles as described throughout.

Both the ego speed as well as the obstacle speeds can be generated using a basic model of how to react to the traffic in front of them. Bang-bang control describes how an object can most quickly converge to a desired steady-state by switching (a minimum number of times, here, once) between the control limits of $a_{min}$ and $a_{max}$. With speed constraints in addition to acceleration constraints, the optimal control policy becomes bang-off-bang. Without loss of generality, bang-bang is often posed as minimum time to origin, but the vehicle control system may move the origin to be the steady-state tracking of the desired following distance, where $d-d^*=0$ and $v_c=v_1$, where $v_c$ represents the velocity of the ego vehicle and $v_1$ represents the velocity of the leader vehicle). D is the distance between the ego and leader vehicles. D* is the optimal following distance.

Figure 11A:
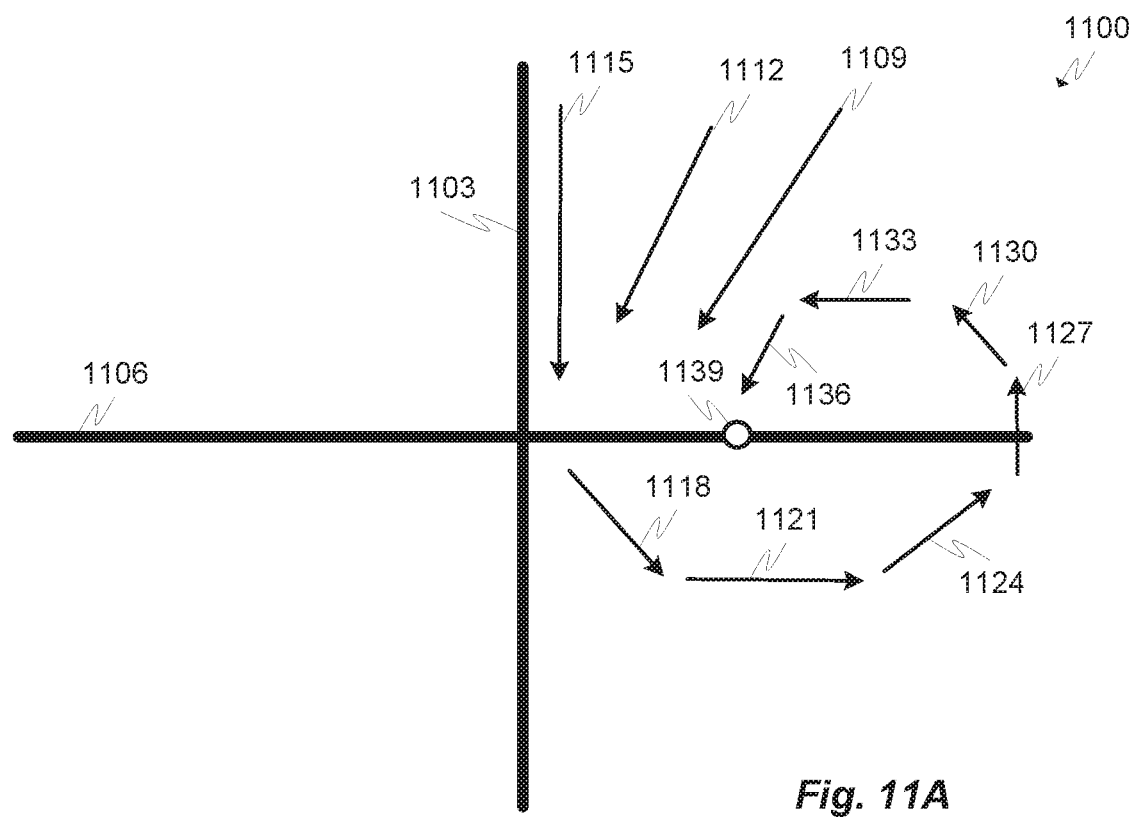
FIG. 11A is an illustration of a phase plane trajectory graph in accordance with one or more of the embodiments presented herein.
Figure 11B:
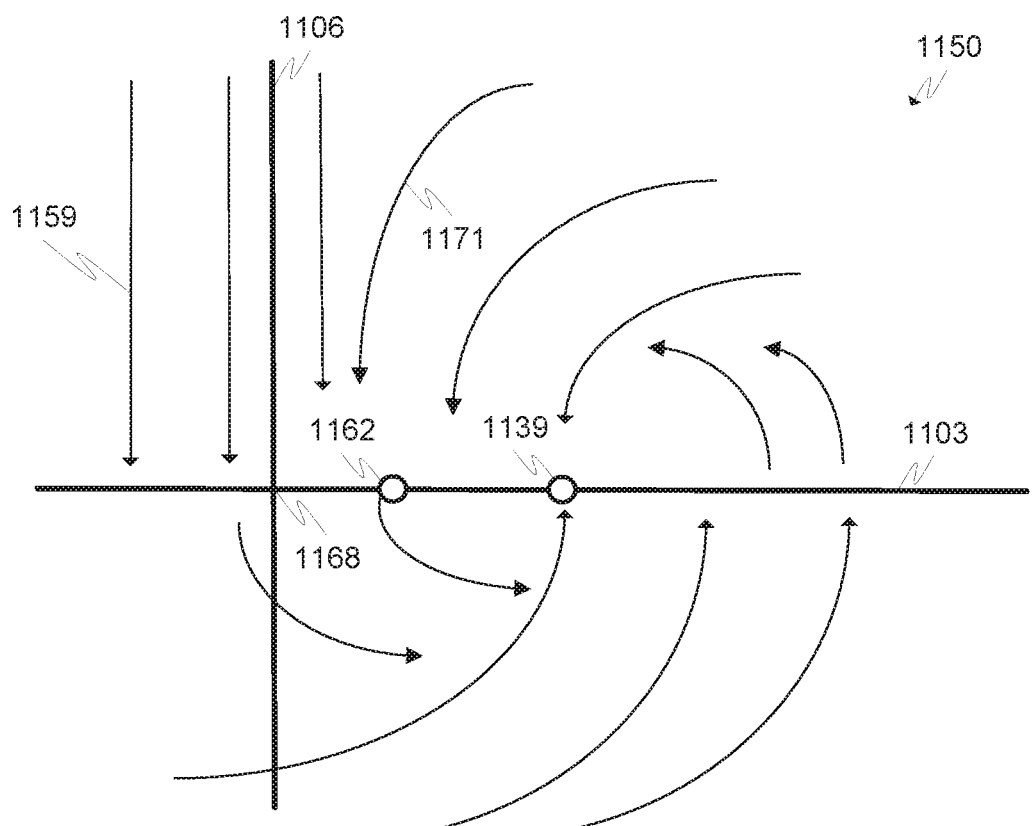
FIG. 11B is an illustration of a phase plane trajectory graph in accordance with one or more of the embodiments presented herein.

A basic bang-bang phase plot is shown in FIG. 11B. Note that $\Delta v = v_{ego} - v_{leader}$ and $d = x_{leader} - x_{ego}$, thereby defining the sign conventions of the phase portrait axes. The single equilibrium point occurs at $[d=d^*; \Delta v=0]$. There is one switching condition above the horizontal axis for transitioning from $a_{max}$ to $a_{min}$, and one below the axis for the opposite transition. States from arbitrary initial conditions follow a total of up to two curves to arrive at the "origin" in finite time.

For this equilibrium to exist across variable leader speeds, the desired distance $d^* = d0 + t_{follow} v_{follow}$ must be defined for some constant nominal leader speed $v_{follow}$ (as opposed to the current ego or leader speed, which can change as functions of time). In some embodiments, the vehicle control system may assign an infinite-horizon steady-state speed for each obstacle and use these values to compute the optimal, or desired, following distance.

One additional factor considered in the graph illustrated in FIG. 11B is the critical distance dent constraint. The vehicle control system may assume that dent is respected by exceeding the (comfort-based) maximum deceleration if necessary (curved trajectory 1121), and this would then be feasible as long as the initial condition has $d > d_{crit}$. If $d \leq d_{crit}$, the problem is poorly defined with regard to this constraint, and he vehicle control system may instead assume the speeds are instantly equalized to $\Delta v = 0$ as a crude description of a collision (straight black trajectories).

With regards to FIGS. 11A, 11B, 12A and 12B, note that the input is the relative acceleration $a_{ego} - a_{leader}$. The maximum relative acceleration can have arbitrary sign, but the vehicle control system may define assumptions such that the minimum relative acceleration is always negative to simplify collision avoidance. That is, the ego vehicle must be capable of decelerating faster than the leader vehicle so as be capable of avoiding collision.

The states (distance and relative speed) for the bang-bang convergence problem are defined relative to the leader, and the leader's known acceleration (which may be assumed to be 0) may be factored in accordingly by defining the control input to this system as the relative acceleration $a_{rel} = a_{ego} - a_{leader}$.

Because these input bounds change with the leader acceleration, the vehicle control system may re-solve the system on each piecewise constant acceleration segment of the leader's speed profile. That is, the vehicle control system may solve for how to converge to the leader and maintain the desired distance indefinitely (where the steady-state is held by matching the leader's acceleration) and apply this policy until the leader's acceleration changes. At this transition to the next segment in the leader's speed profile, the vehicle control system may identify the new relative acceleration bounds and again solve for the bang-bang speed profile given the new initial conditions.

Every state is reachable (can be reached by the ego vehicle from the origin in some amount of time) under bang-bang control if the acceleration limits allow both positive and negative accelerations. Typically, the vehicle control system may assume boundaries on the absolute acceleration to be $a_{min} \leq a_{ego} \leq a_{max}$ where $a_{min} < 0$ and $a_{max} > 0$. However, dealing with calculations of the ego vehicles acceleration relative to a leader vehicle's acceleration may be more difficult as there is no guarantee of the range of the relative acceleration, due to the dependency on the leader's acceleration. To guarantee the ego vehicle's ability to reduce its relative speed (for collision avoidance), the vehicle control system may make the somewhat artificial assumption that each car can always decelerate faster than its most proximal leader. Thus, in some cases if the acceleration of the leader becomes less than $a_{min}$, the vehicle control system may adjust $a_{min}$ to be equal to $a_{leader} - a_{min\ rel}$ for some minimum negative relative acceleration. This adjustment may result in the final lower bound of $a_{rel}$ being negative.

In some embodiments, a vehicle control system may take into consideration one or more vehicles ahead of the ego vehicle. For example, an ego vehicle may follow behind a leading vehicle at a following distance. The vehicle control system may select a goal following distance based on a number of factors. The vehicle control system may determine an optimal following distance. The optimal following distance may be at a close, but safe distance from the leading vehicle and may be selected based on the speed of the vehicles to ensure the ego vehicle may be capable of stopping in the event of an unexpected slowdown of the leading vehicle.

The speed profiles or control schemes to be executed by the vehicle control system in order to follow a leading vehicle at an optimal following distance may be plotted on a phase plot as illustrated in FIG. 11A.

In FIG. 11A, a two-axis graph 1100 is illustrated. A vertical axis 1103 may illustrate a relative velocity of the ego vehicle compared to a leading vehicle. The vertical axis 1103 may plot the ego vehicle velocity minus the leading vehicle velocity. As such, the higher a point is on the vertical axis 1103, the faster the ego vehicle is travelling compared to the leading vehicle. Points along the horizontal axis 1106 may represent the ego and leading vehicles travelling at a same speed.

Points below the horizontal axis 1106 may represent the ego vehicle travelling slower than the leading vehicle.

The horizontal axis 1106 may plot a distance between the ego and leading vehicles. The further to the right a point is on the graph 1100 the further the ego vehicle is from the leading vehicle. The further to the left a vehicle is on the graph 1100 the closer the ego vehicle is to the leading vehicle. Points along the vertical axis 1103 may represent the ego vehicle physically touching the leading vehicle if the ego and leading vehicles are in the same lane. The graph may also be used to represent a situation with a leading vehicle in a lane other than the ego lane, in which case points along the vertical axis 1103 may represent the ego vehicle beginning to pass the leading vehicle.

An origin of the graph 1100 shown by the intersection of the horizontal axis 1106 and the vertical axis 1103 may represent the ego vehicle physically touching the leading vehicle, if travelling in the same lane, while travelling at the same speed.

Points in the upper left quadrant, above the horizontal axis 1106 and to the left of the vertical axis 1103 may represent the ego vehicle travelling at a faster speed compared to the leading vehicle without any distance between the ego and leading vehicles. If the ego and leading vehicles are in the same lane, points in the upper left quadrant may represent a collision.

Points in the upper right quadrant, above the horizontal axis 1106 and to the right of the vertical axis 1103 may represent the ego vehicle travelling at a faster speed compared to the leading vehicle with a positive distance between the ego and leading vehicles.

Points in the lower right quadrant, below the horizontal axis 1106 and to the right of the vertical axis 1103 may represent the ego vehicle travelling at a lower speed compared to the leading vehicle with a positive distance between the ego and leading vehicles.

Points in the lower left quadrant, below the horizontal axis 1106 and to the left of the vertical axis 1103 may represent the ego vehicle travelling at a lower speed compared to the leading vehicle without any distance between the ego and leading vehicles. If the ego and leading vehicles are in the same lane, points in the lower left quadrant may represent a collision.

To execute a lane change maneuver in a scenario in which there is a leading vehicle in either the ego lane or a target lane, the vehicle control system of the ego vehicle may determine an optimal following distance to follow behind the leading vehicle. An optimal following distance should be on the right side of the vertical axis 1103, representing a positive distance between the ego vehicle and the leading vehicle.

In some circumstances, the vehicle control system may determine a rate of speed equal to that of the leading vehicle is optimal to execute a lane change maneuver. In such circumstances, the optimal position for the ego vehicle will be on the horizontal axis 1106 and to the right of the vertical axis 1103.

Arrows 1109, 1112, 1115, 1118, 1121, 1124, 1127, 1130, 1133, and 1136 represent vector goal trajectories for an ego vehicle to reach an optimal following distance represented by the point 1139 indicated in FIG. 11A.

For example, a vehicle control system of an ego vehicle at the tail end of the arrow 1115 may determine the ego vehicle is too close to the leading vehicle and travelling too fast in comparison to the leading vehicle. In response to such a decision, the vehicle control system may determine a proper action is to decelerate at a maximum deceleration, effectively hitting the brakes. As illustrated by the direction of the arrow 1115, the relative speed should greatly decrease while the distance between the vehicles should remain the same.

A vehicle at the tail end of the arrow 1118 is travelling slower than the leading vehicle but is still too close to the leading vehicle. In such a scenario, the vehicle control system may determine a moderate deceleration is appropriate as indicated by the arrow 1118.

A vehicle at the tail end of the arrow 1121 is travelling slower than the leading vehicle but is closer to the leading vehicle than the optimal following distance 1139. In such a scenario, the vehicle control system may determine maintaining a same velocity differential compared to the leading vehicle is appropriate as indicated by the arrow 1121. For example, if both the ego and leading vehicles are driving at constant speeds, and the ego vehicle is driving slightly slower than the leading vehicle, the ego vehicle may continue driving at the slower but constant speed until reaching a point near the tail end of the arrow 1124.

A vehicle at the tail end of the arrow 1124 is travelling slower than the leading vehicle but is now further from the leading vehicle than the optimal distance 1139. In such a scenario, the vehicle control system may determine a moderate acceleration is appropriate as indicated by the arrow 1124.

A vehicle at the tail end of the arrow 1127 is travelling slightly slower than the leading vehicle and is still too far from the leading vehicle. In such a scenario, the vehicle control system may apply a moderate acceleration to follow the trajectory as indicated by the arrow 1127.

A vehicle at the tail end of the arrow 1130 is travelling slightly faster than the leading vehicle but is still too far from the leading vehicle. In such a scenario, the vehicle control system may alter the acceleration of the vehicle to follow the trajectory indicated by the arrow 1130.

A vehicle at the tail end of the arrow 1133 is travelling faster than the leading vehicle but is still too far from the leading vehicle. In such a scenario, the vehicle control system may alter the acceleration of the vehicle to follow the trajectory indicated by the arrow 1130.

A vehicle at the tail end of the arrow 1136 is travelling faster than the leading vehicle but is still too far from the leading vehicle. In such a scenario, the vehicle control system may alter the acceleration of the vehicle to follow the trajectory indicated by the arrow 1136.

A vehicle at the tail end of the arrow 1109 is travelling much faster than the leading vehicle but is relatively close to the optimal following distance 1139. In such a scenario, the vehicle control system may alter the acceleration of the vehicle to follow the trajectory indicated by the arrow 1109.

A vehicle at the tail end of the arrow 1112 is travelling much faster than the leading vehicle but is relatively close to the optimal following distance 1139. In such a scenario, the vehicle control system may alter the acceleration of the vehicle to follow the trajectory indicated by the arrow 1112.

A more detailed trajectory phase plane chart 1150 is illustrated in FIG. 11B. As can be appreciated, the acceleration plans executed by the vehicle control system may be gradually executed as illustrated by the curved vector arrows. In addition to determining an optimal following distance 1139, the vehicle control system may also determine a critical following distance 1162. The critical distance 1162 may be selected from distances which are less than optimal but relatively safe. Vehicles at distances between the optimal following distance 1139 and the critical distance 1162 may be capable of returning to the optimal distance using relatively moderate acceleration profiles.

For example, the vehicle control system may adjust the acceleration of the vehicle between a minimum and a maximum acceleration. During normal operation of the vehicle, the vehicle control system may set the minimum acceleration to a higher rate than is physically possible. The minimum acceleration may be determined based on comfort for the driver and passengers, road quality, weather conditions, safety, etc.

Similarly, the maximum acceleration may be set to a lower rate than is physically possible. The maximum may also be determined based on comfort for the driver and passengers, road quality, weather conditions, safety, etc.

In most situations, it may be possible to stay within the normal maximum and minimum boundaries for the acceleration.

For example, as illustrated in FIG. 11B, a vehicle at positions reflected by the tail end of arrows may be capable of approaching the optimal following distance by applying the minimum acceleration. Similarly, a vehicle at positions reflected by the tail end of arrows may be capable of approaching the optimal following distance by applying the maximum acceleration. However, a vehicle at positions reflected by the tail end of arrows may not be capable of approaching the optimal following distance by staying within the normal maximum and minimum acceleration boundaries. Such a vehicle may be required to apply a total maximum or total minimum acceleration to avoid a collision with a leading vehicle.

As can be appreciated, in most scenarios, an ego vehicle may approach an optimal following distance using a relatively simple control scheme. By choosing a maximum and minimum acceleration rate for the vehicle to be used in normal operating conditions, the processor and memory requirements to determine a proper speed profile to arrive at a particular following distance may be reduced.

As described above, every state is reachable (can be reached by the ego vehicle from the origin in some amount of time) under bang-bang control if the acceleration limits allow both positive and negative accelerations. Typically, the vehicle control system may assume boundaries on the absolute acceleration to be $a_{min} \leq a_{go} \leq a_{max}$ where $a_{min} < 0$ and $a_{max} > 0$. However, dealing with calculations of the ego vehicles acceleration relative to a leader vehicle's acceleration may be more difficult as there is no guarantee of the range of the relative acceleration, area due to the dependency on the leader's acceleration. To guarantee the ego vehicle's ability to reduce its relative speed (for collision avoidance), the vehicle control system may make the somewhat artificial assumption that each car can always decelerate faster than its most proximal leader. Thus, in some cases if the acceleration of the leader becomes less than $a_{min}$, the vehicle control system may adjust $a_{min}$ to be equal to $a_{leader} - a_{min\ rel}$ for some minimum negative relative acceleration. This adjustment may result in the final lower bound of $a_{rel}$ being negative.

Meanwhile, there may not be a practical need to guarantee the ego vehicle's ability to accelerate faster than the leader, it is possible to have the maximum area be zero or even less than zero (when the leader is accelerating quickly). As accelerating slower than a leading vehicle may not lead to a collision or other dangerous situation. This allows for the basic nature of the bang-bang phase portrait to be modified and the equilibrium conditions may be changed. If the relative maximum acceleration (the acceleration of the leader minus the maximum acceleration of the ego vehicle) is zero, everything below the horizontal axis is an equilibrium in that the relative speed is constant (but the distance between the vehicles is always increasing as the ego vehicle is travelling slower than the leading vehicle). If the maximum relative acceleration is less than zero, i.e., the leading vehicle is accelerating at a greater rate than the ego vehicle is capable of, everything below the horizontal axis is a steady-state in that the ego vehicle may hold its maximum acceleration indefinitely, but the speed difference is always decreasing and the distance is always increasing. Both of these cases require specific modifications to the algebraic solver of the bang-bang system (the former is a linear system that is singular if represented quadratically, the latter is an "inverted" version whose relevant root is the opposite of the standard system).

In some situations, the leading vehicle may be accelerating at the same rate as the maximum acceleration of the ego vehicle. This maximum acceleration may be the ego vehicle's total maximum acceleration or may be the maximum acceleration for normal operation of the vehicle which may be less than the ego vehicle's total maximum acceleration.

As illustrated in FIG. 12A, the vehicle control system may follow a particular control scheme based on a phase plot 1200 in the case of the ego vehicle travelling behind a leader vehicle accelerating at the same rate as the ego vehicle's maximum acceleration. Horizontal arrows 1203, 1206 indicate the ego vehicle and the leader vehicle travelling at the same relative velocity, and thus accelerating at the same rate.

As can be appreciated, if the ego vehicle is travelling at a slower speed compared to the leader vehicle, the vehicle control system may follow instructions according to the arrows 1203 and accelerate the ego vehicle at its maximum acceleration. As the leader vehicle is also travelling at the ego vehicle's maximum acceleration, the vehicles will retain the same speed differential.

If the ego vehicle is further from the leader vehicle than the optimal following distance 1209 and slightly faster than the leader vehicle, the vehicle control system may follow instructions according to the arrows 1206 and accelerate the ego vehicle at its maximum acceleration. As the leader vehicle is also travelling at the ego vehicle's maximum acceleration, the vehicles will retain the same speed differential. Because the ego vehicle is travelling faster than the leader vehicle, the ego vehicle will close in on the optimal following distance.

If the ego vehicle is further from the leader vehicle than the optimal following distance 1209 and much faster than the leader vehicle, the vehicle control system may follow instructions according to the arrows 1212 and accelerate the ego vehicle at its minimum acceleration (or its maximum deceleration). As the leader vehicle is travelling at the ego vehicle's maximum acceleration, the relative speed of the ego vehicle will decrease and the vehicles speed will near equalization. Because the ego vehicle is travelling faster than the leader vehicle, the ego vehicle will close in on the optimal 1209 or at least the critical 1215 following distance.

If the ego vehicle is closer to the leader vehicle than the critical following distance 1215 and faster than the leader vehicle, the vehicle control system may follow instructions according to the arrows 1218 and accelerate the ego vehicle at a rate lower than its normal minimum acceleration (or greater than its maximum deceleration). In some cases, the vehicle control system may decelerate the vehicle as quickly as possible to avoid a collision. As the leader vehicle is travelling at the ego vehicle's maximum acceleration, the relative speed of the ego vehicle will decrease and the vehicles speed will near equalization. Because the ego vehicle is travelling faster than the leader vehicle, the ego vehicle will close in on the optimal 1209 or at least the critical 1215 following distance.

In some situations, the leading vehicle may be accelerating at a faster rate than the maximum acceleration of the ego vehicle. This maximum acceleration may be the ego vehicle's total maximum acceleration or may be the maximum acceleration for normal operation of the vehicle which may be less than the ego vehicle's total maximum acceleration.

As illustrated in FIG. 12B, the vehicle control system may follow a particular control scheme based on a phase plot 1250 in the case of the ego vehicle travelling behind a leader vehicle accelerating at a faster rate than the ego vehicle's maximum acceleration.

As can be appreciated, if the ego vehicle is travelling at a slower speed compared to the leader vehicle, the vehicle control system may follow instructions according to the arrows 1253 and accelerate the ego vehicle at its maximum acceleration. As the leader vehicle is travelling faster than the ego vehicle's maximum acceleration, the ego vehicle will not keep up with the leader vehicle's distance and will slip further behind.

If the ego vehicle is further from the leader vehicle than the optimal following distance 1209 and slightly faster than the leader vehicle, the vehicle control system may follow instructions according to the arrows 1256 and accelerate the ego vehicle at its maximum acceleration. As the leader vehicle is accelerating at a greater rate than the ego vehicle's maximum acceleration, and because the ego vehicle is travelling faster than the leader vehicle, the ego vehicle will close in on the optimal following distance.

If the ego vehicle is further from the leader vehicle than the optimal following distance 1209 and much faster than the leader vehicle, the vehicle control system may follow instructions according to the arrows 1212 and accelerate the ego vehicle at its minimum acceleration (or its maximum deceleration). As the leader vehicle is accelerating at a greater rate than the ego vehicle's maximum acceleration, the relative speed of the ego vehicle will decrease and the vehicles speed will near equalization. Because the ego vehicle is travelling faster than the leader vehicle, the ego vehicle will close in on the optimal 1209 or at least the critical 1215 following distance.

If the ego vehicle is closer to the leader vehicle than the critical following distance 1215 and faster than the leader vehicle, the vehicle control system may follow instructions according to the arrows 1218 and accelerate the ego vehicle at a rate lower than its normal minimum acceleration (or greater than its maximum deceleration). In some cases, the vehicle control system may decelerate the vehicle as quickly as possible to avoid a collision. As the leader vehicle is travelling at the ego vehicle's maximum acceleration, the relative speed of the ego vehicle will decrease and the vehicles speed will near equalization. Because the ego vehicle is travelling faster than the leader vehicle, the ego vehicle will close in on the optimal 1209 or at least the critical 1215 following distance.

In some embodiments, the vehicle control system may, in addition to considering a proper following distance from a leader vehicle, consider maximum and/or minimum speed limits. Maximum and minimum speed limits may be set by laws or may be determined by the vehicle control system based on considerations of road types, qualities of the ego and/or leader vehicles, weather conditions, and/or other factors. The vehicle control system may keep maximum and/or minimum speed limit data in an onboard database or may access such data from a network location.

The vehicle control system may consider maximum and minimum speed limits as additional constraints. Such additional considerations may change the optimal speed profile policy from a bang-bang policy to potentially a bang-off-bang policy. As used herein, the term bang-bang refers to a speed profile with a first acceleration rate for a first period of time followed by a second acceleration rate for a second period of time with an immediate, or near immediate, switch between the first and second acceleration rates. In some embodiments, one of the first and second acceleration rates may be a maximum acceleration within a range of normal operation acceleration rates while the other of the first and second acceleration rates may be a minimum acceleration within the range of normal operation acceleration rates.

The term bang-off-bang may refer to a speed profile with a first acceleration rate for a first period of time followed by the ego vehicle coasting for a second period of time followed by a second acceleration rate for a third period of time with immediate, or near immediate, switches between the first acceleration rate and coasting and between coasting and the second acceleration rate. In some embodiments, one of the first and second acceleration rates may be a maximum acceleration within a range of normal operation acceleration rates while the other of the first and second acceleration rates may be a minimum acceleration within the range of normal operation acceleration rates.

In some embodiments, the vehicle control system may impose a minimum speed of zero mph to prevent reversing, and a maximum speed that matches the legal speed limit. In effect, the control system will try to catch the ego vehicle up to the leader vehicle as long as the speed of the ego vehicle stays below the maximum speed limit.

In some situations, the vehicle control system may execute a bang-off-bang control scheme, following a phase plane, while taking into consideration a maximum speed limit and a minimum speed limit. The scenarios illustrated in FIGS. 13A and 13B, described below, assume the leader is travelling at a constant velocity. In a different scenario in which the leader is accelerating or decelerating, the speed limits 1306 and 13309 would not appear as horizontal lines, but as parabolas in the phase plane 1300 of relative coordinates.

Figure 13B:
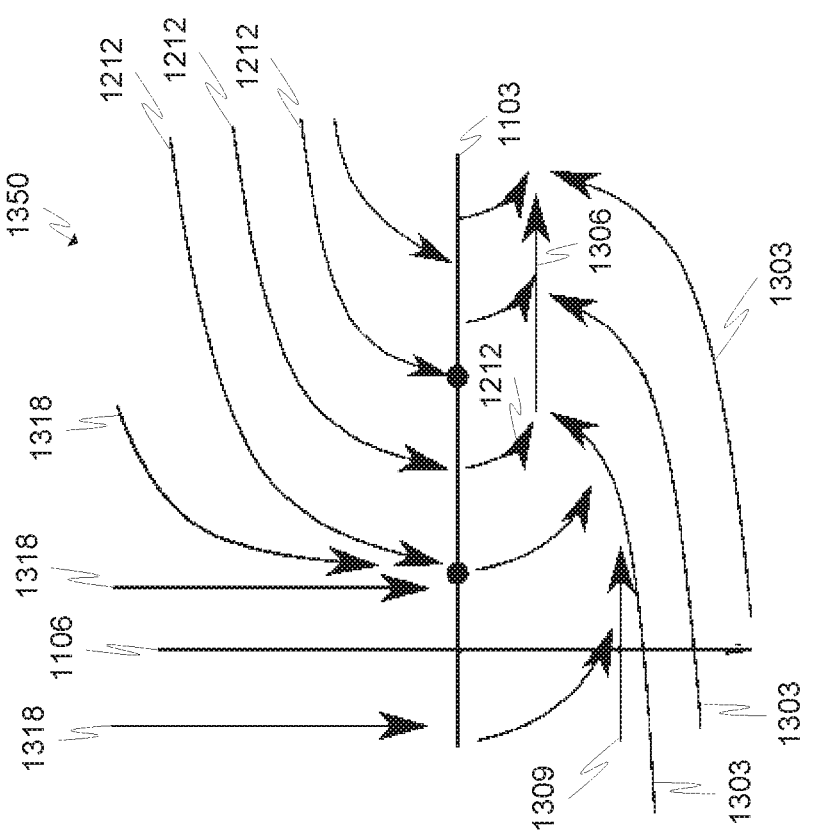
FIG. 13B is an illustration of a phase plane trajectory graph in accordance with one or more of the embodiments presented herein.
Figure 13A:
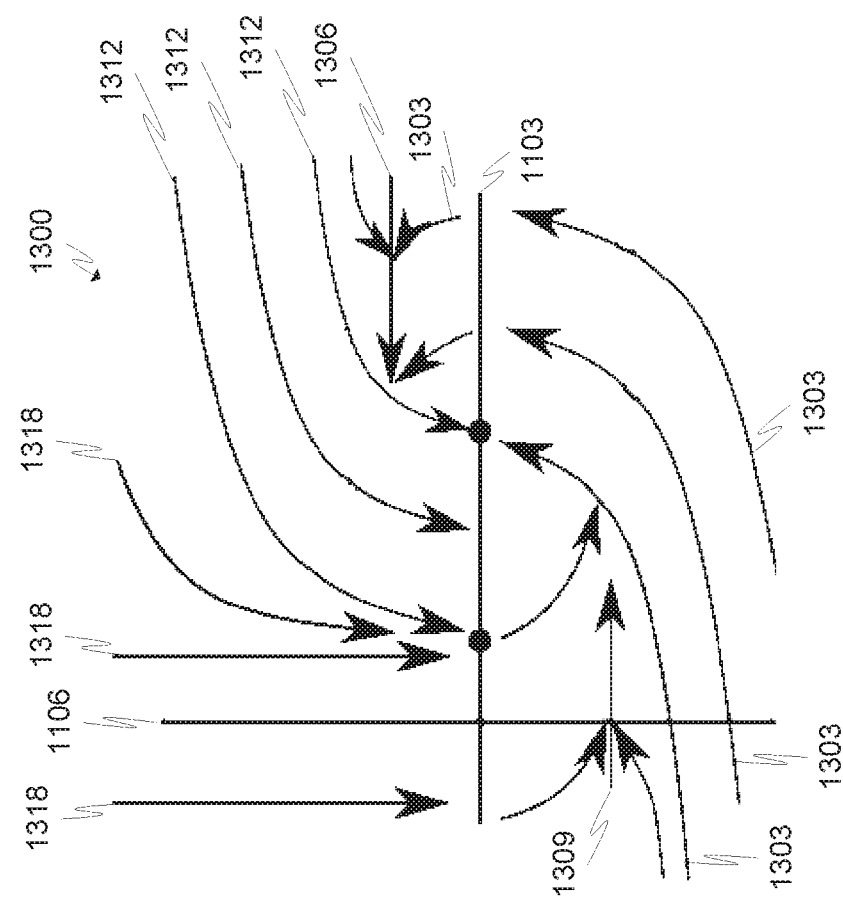
FIG. 13A is an illustration of a phase plane trajectory graph in accordance with one or more of the embodiments presented herein.

In the scenario illustrated in FIG. 13A, the speed limit is faster than the leader, and the vehicle control system is executing a classic bang-off-bang system. In such a scenario, the ego vehicle control system may determine an action based on a phase plane similar to the phase plane 1300 illustrated in FIG. 13A.

In the event that the ego vehicle is travelling at a lower speed than both the leader vehicle and the minimum speed limit 1309, the vehicle control system may determine, based on a phase plane 1300 as illustrated in FIG. 13A, that an application of the maximum acceleration 1303 is appropriate.

In the event that the ego vehicle is travelling above the minimum speed limit 1309, close to the critical distance 1215, the vehicle control system may determine, based on a phase plane 1300 as illustrated in FIG. 13A, that an application of the minimum acceleration 1312 is appropriate.

In the event that the ego vehicle is travelling close to or beyond the optimal following distance 1209, while slower than the leader vehicle, the vehicle control system may determine, based on a phase plane 1300 as illustrated in FIG. 13A, that an application of the maximum acceleration 1303 is appropriate.

In the event that the ego vehicle is travelling further than the optimal following distance 1209 while below the maximum speed limit 1306, the vehicle control system may determine, based on a phase plane 1300 as illustrated in FIG. 13A, that an application of the maximum acceleration 1303 is appropriate.

In the event that the ego vehicle is travelling faster than the maximum speed limit 1306, the vehicle control system may determine, based on a phase plane 1300 as illustrated in FIG. 13A, that an application of the minimum acceleration 1312 is appropriate.

In the event that the ego vehicle is travelling at, near, or less than, the optimal following distance 1209 while travelling faster than the leader, the vehicle control system may determine, based on a phase plane 1300 as illustrated in FIG. 13A, that an application of the minimum acceleration 1312 is appropriate.

In the event that the ego vehicle is travelling at or less than the critical following distance 1215, the vehicle control system may determine, based on a phase plane 1300 as illustrated in FIG. 13A, that an application of an acceleration less than the minimum acceleration 1318 is appropriate.

As discussed herein, the term minimum acceleration may refer to a lowest acceleration, or highest deceleration, rate during normal operation of the vehicle. For example, the vehicle control system may normally avoid effectively braking the vehicle as quickly as possible. As illustrated in FIG. 13A, in some scenarios, decelerating faster than the highest normal deceleration rate may be required to avoid a collision. Such scenarios may be limited to extraordinary or emergency situations.

In another scenario, as illustrated in FIG. 13B, the leader may be travelling at a speed greater than the maximum speed limit as set by law or determined by the ego vehicle control system. As such, the leader-following "origin" may not be an equilibrium point and all trajectories may eventually converge to the maximum speed limit. In such a scenario, the ego vehicle control system may determine an action based on a phase plane similar to the phase plane 1350 illustrated in FIG. 13B.

For example, in the event that the ego vehicle is travelling at less than the minimum speed limit 1309, the vehicle control system may determine, based on a phase plane 1350 as illustrated in FIG. 13b, that an application of the maximum acceleration 1303 is appropriate.

In the event that the ego vehicle is travelling at greater than the maximum speed limit 1306, the vehicle control system may determine, based on a phase plane 1350 as illustrated in FIG. 13b, that an application of the minimum acceleration 1312 is appropriate.

In the event that the ego vehicle is travelling between the maximum 1306 and minimum 1309 speed limits while at least near the optimal following distance 1209, the vehicle control system may determine, based on a phase plane 1350 as illustrated in FIG. 13b, that an application of the maximum acceleration 1303 is appropriate.

In the event that the ego vehicle is travelling between the maximum 1306 and minimum 1309 speed limits while closer than the optimal following distance 1209, the vehicle control system may determine, based on a phase plane 1350 as illustrated in FIG. 13b, that an application of the minimum acceleration 1312 is appropriate.

In the event that the ego vehicle is travelling at or less than the critical following distance 1215, the vehicle control system may determine, based on a phase plane 1350 as illustrated in FIG. 13b, that an application of the less than minimum acceleration 1318 is appropriate.

Finite State Machine Implementation:

On each constant-acceleration segment of the leader's speed profile, the vehicle control system may use this phase-plane, or phase-portrait, analysis to solve for the closed-loop longitudinal motion of the ego vehicle. Given any initial condition (in terms of relative distance, speed difference Δv, and leader acceleration for determining the input limits), the vehicle control system can compute which region of the phase portrait the initial condition lies in. From there, the vehicle control system can analytically propagate the state to up to transition to the next region of the phase portrait and repeat this process until either the end of the leader segment's duration or until a steady-state is reached. Note that after explicitly computing "which region" for the initial condition, the subsequent regions can be directly inherited from the transition model without re-computation.

During the LC phase, the ego vehicle occupies two lanes at once. In some embodiments, the closed-loop speed profile may be designed to converge directly to the leader in the target lane, and the trajectory may then be checked for optimality and feasibility with regard to any obstacles in the ego lane during the LC phase. In some embodiments, it may be more appropriate to compute the closed-loop LC-phase speed profile with consideration of leaders in both lanes.

To do this, the vehicle control system may execute a function to keep track of two phase-plane-based solvers running in parallel, one for each lane. Starting from the initial condition, the vehicle control system, via the function, may choose the more conservative solution of the two, as defined by a lower acceleration command in the first ego segment. The vehicle control system may then set this lower acceleration as the maximum acceleration in the other lane and re-solves for the closed loop motion in the other lane given the new, tighter constraints on acceleration. Now that both lanes are propagated with the same acceleration, the function may select the earlier end-time of the two ego-segments, set the next node in the ego speed profile, and repeat the process using the state at this node as the new initial condition. In effect, this equivalently forward integrates the ego motion by using the more conservative braking in either lane at any point in time. The process of setting a constraint and resolving the "other" lane is a necessary step for identifying the correct transition to a new region of the phase portrait in either lane.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method of controlling a vehicle, the method comprising: determining, by a vehicle control system of the vehicle, a range of lane change initiation times; for a plurality of lane change initiation times in the range of lane change initiation times, determining, by the vehicle control system, a set of reachable states, the set of reachable states comprising a plurality of reachable states; for two or more reachable states of the plurality of reachable states, computing, by the vehicle control system, a corresponding ensuing trajectory; comparing, by the vehicle control system, each of the computed ensuing trajectories corresponding to the two or more reachable states; and based on the comparison of the computed ensuing trajectories, determining, by the vehicle control system, an optimal lane change maneuver from a first lane to a second lane to be executed by the vehicle.

Aspects of the above method include wherein each reachable state of the plurality of reachable states comprises a distance travelled by the vehicle and a velocity of the vehicle.

Aspects of the above method include wherein executing the optimal lane change maneuver comprises repositioning the vehicle in the first lane to the reachable state used to compute the optimal lane change maneuver.

Aspects of the above method include wherein executing the optimal lane change maneuver further comprises computing a speed profile to reach the reachable state used to compute the optimal lane change maneuver.

Aspects of the above method include wherein the speed profile comprises a bang-bang profile.

Aspects of the above method include wherein the bang-bang profile comprises a minimum acceleration rate and a maximum acceleration rate.

Aspects of the above method include wherein determining the optimal lane change maneuver comprises determining an optimal following distance for a leading vehicle in the first lane.

Aspects of the above method include wherein determining the optimal lane change maneuver comprises determining an optimal following distance for a leading vehicle in the second lane.

Aspects of the above method include wherein determining the optimal lane change maneuver comprises determining an optimal following distance for a first leading vehicle in the first lane and a second leading vehicle in the second lane.

Aspects of the above method include wherein the set of reachable states is limited by one or more of a position of a leading vehicle and a speed limit.

Embodiments include a vehicle control system for controlling a vehicle, the system comprising: a memory; and a processor in communication with the memory, the processor operable to: determine a range of lane change initiation times; for a plurality of lane change initiation times in the range of lane change initiation times, determine a set of reachable states, the set of reachable states comprising a plurality of reachable states; for two or more reachable states of the plurality of reachable states, compute a corresponding ensuing trajectory; compare each of the computed ensuing trajectories corresponding to the two or more reachable states; based on the comparison of the computed ensuing trajectories, determine an optimal lane change maneuver; and cause the vehicle to perform the optimal lane change maneuver from a first lane to a second lane.

Aspects of the above vehicle control system include wherein each reachable state of the plurality of reachable states comprises a distance travelled by the vehicle and a velocity of the vehicle.

Aspects of the above vehicle control system include wherein executing the optimal lane change maneuver comprises repositioning the vehicle in the first lane to the reachable state used to compute the optimal lane change maneuver.

Aspects of the above vehicle control system include wherein executing the optimal lane change maneuver further comprises computing a speed profile to reach the reachable state used to compute the optimal lane change maneuver.

Aspects of the above vehicle control system include wherein the speed profile comprises a bang-bang profile.

Aspects of the above vehicle control system include wherein the bang-bang profile comprises a minimum acceleration rate and a maximum acceleration rate.

Aspects of the above vehicle control system include wherein determining the optimal lane change maneuver comprises determining an optimal following distance for a leading vehicle in the first lane.

Aspects of the above vehicle control system include wherein determining the optimal lane change maneuver comprises determining an optimal following distance for a leading vehicle in the second lane.

Aspects of the above vehicle control system include wherein determining the optimal lane change maneuver comprises determining an optimal following distance for a first leading vehicle in the first lane and a second leading vehicle in the second lane.

Embodiments include a computer-readable medium having stored thereon instructions that cause a processor of a vehicle control system of a vehicle to execute a method, the method comprising: determining, by the vehicle control system, a range of lane change initiation times; for a plurality of lane change initiation times in the range of lane change initiation times, determining, by the vehicle control system, a set of reachable states, the set of reachable states comprising a plurality of reachable states; for one or more reachable states of the plurality of reachable states, computing, by the vehicle control system, a corresponding ensuing trajectory; comparing, by the vehicle control system, each of the computed ensuing trajectories; based on the comparison of the computed ensuing trajectories, determining, by the vehicle control system, an optimal lane change maneuver; and executing, by the vehicle control system, the optimal lane change maneuver by controlling the vehicle from a first lane to a second lane.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A method of controlling a vehicle, the method comprising:
   receiving, by a vehicle control system of the vehicle, data associated with one or more vehicles;
   determining, by the vehicle control system, a range of lane change initiation times based on the data associated with the one or more vehicles;
   for a plurality of lane change initiation times in the range of lane change initiation times, determining, by the vehicle control system, a set of reachable states, the set of reachable states comprising a plurality of reachable states;
   for two or more reachable states of the plurality of reachable states, computing, by the vehicle control system, a corresponding ensuing trajectory;
   comparing, by the vehicle control system, each of the computed corresponding ensuing trajectories corresponding to the two or more reachable states; and
   based on the comparison of each of the computed corresponding ensuing trajectories, determining, by the vehicle control system, an optimal lane change maneuver from a first lane to a second lane to be executed by the vehicle; and
   causing, by the vehicle control system, the vehicle to perform the optimal lane change maneuver.

2. The method of claim 1, wherein each reachable state of the plurality of reachable states comprises a distance travelled by the vehicle and a velocity of the vehicle.

3. The method of claim 1, wherein causing the vehicle to perform the optimal lane change maneuver comprises repositioning the vehicle in the first lane to a reachable state of the two or more reachable states used to compute the optimal lane change maneuver.

4. The method of claim 3, wherein causing the vehicle to perform the optimal lane change maneuver further comprises computing a speed profile to reach the reachable state used to compute the optimal lane change maneuver.

5. The method of claim 4, wherein the speed profile comprises a bang-bang profile.

6. The method of claim 5, wherein the bang-bang profile comprises a minimum acceleration rate and a maximum acceleration rate.

7. The method of claim 1, wherein determining the optimal lane change maneuver comprises determining an optimal following distance for a leading vehicle in the first lane.

8. The method of claim 1, wherein determining the optimal lane change maneuver comprises determining an optimal following distance for a leading vehicle in the second lane.

9. The method of claim 1, wherein determining the optimal lane change maneuver comprises determining an optimal following distance for a first leading vehicle in the first lane and a second leading vehicle in the second lane.

10. The method of claim 1, wherein the set of reachable states is limited by one or more of a position of a leading vehicle and a speed limit.

11. A vehicle control system for controlling a vehicle, the vehicle control system comprising:
   a memory; and
   a processor in communication with the memory, the processor operable to:
   receive data associated with one or more vehicles;
   determine a range of lane change initiation times based on the data associated with the one or more vehicles;
   for a plurality of lane change initiation times in the range of lane change initiation times, determine a set of reachable states, the set of reachable states comprising a plurality of reachable states;
   for two or more reachable states of the plurality of reachable states, compute a corresponding ensuing trajectory;
   compare each of the computed corresponding ensuing trajectories corresponding to the two or more reachable states;
   based on the comparison of each of the computed corresponding ensuing trajectories, determine an optimal lane change maneuver from a first lane to a second lane; and
   cause the vehicle to perform the optimal lane change maneuver from a first lane to a second lane.

12. The vehicle control system of claim 11, wherein each reachable state of the plurality of reachable states comprises a distance travelled by the vehicle and a velocity of the vehicle.

13. The vehicle control system of claim 11, wherein causing the vehicle to perform the optimal lane change maneuver comprises repositioning the vehicle in the first lane to a reachable state of the two or more reachable states used to compute the optimal lane change maneuver.

14. The vehicle control system of claim 13, wherein causing the vehicle to perform the optimal lane change maneuver further comprises computing a speed profile to reach the reachable state used to compute the optimal lane change maneuver.

15. The vehicle control system of claim 14, wherein the speed profile comprises a bang-bang profile.

16. The vehicle control system of claim 15, wherein the bang-bang profile comprises a minimum acceleration rate and a maximum acceleration rate.

17. The vehicle control system of claim 11, wherein determining the optimal lane change maneuver comprises determining an optimal following distance for a leading vehicle in the first lane.

18. The vehicle control system of claim 11, wherein determining the optimal lane change maneuver comprises determining an optimal following distance for a leading vehicle in the second lane.

19. The vehicle control system of claim 11, wherein determining the optimal lane change maneuver comprises determining an optimal following distance for a first leading vehicle in the first lane and a second leading vehicle in the second lane.

20. A computer-readable medium having stored thereon instructions that cause a processor of a vehicle control system of a vehicle to execute a method, the method comprising:
   receiving, by the vehicle control system, data associated with one or more vehicles;
   determining, by the vehicle control system, a range of lane change initiation times based on the data associated with the one or more vehicles;
   for a plurality of lane change initiation times in the range of lane change initiation times, determining, by the vehicle control system, a set of reachable states, the set of reachable states comprising a plurality of reachable states;
   for one or more reachable states of the plurality of reachable states, computing, by the vehicle control system, a corresponding ensuing trajectory;
   comparing, by the vehicle control system, each of the computed corresponding ensuing trajectories;
   based on the comparison of each of the computed corresponding ensuing trajectories, determining, by the vehicle control system, an optimal lane change maneuver; and
   executing, by the vehicle control system, the optimal lane change maneuver by controlling the vehicle from a first lane to a second lane.

* * * * *